United States Patent
Miura et al.

(10) Patent No.: US 10,421,844 B2
(45) Date of Patent: Sep. 24, 2019

(54) SURFACE TREATMENT METHOD FOR MOLDED ARTICLE, AND MOLDED ARTICLE PRODUCED FROM MATERIAL CONTAINING CYCLIC OLEFIN RESIN

(75) Inventors: Masaki Miura, Tokyo (JP); Shinji Suzuki, Tokyo (JP); Kinichi Morita, Tokyo (JP); Toshikazu Kawaguchi, Hokkaido (JP); Katsuaki Shimazu, Hokkaido (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 363 days.

(21) Appl. No.: 14/116,103

(22) PCT Filed: May 16, 2012

(86) PCT No.: PCT/JP2012/062505
§ 371 (c)(1),
(2), (4) Date: Nov. 6, 2013

(87) PCT Pub. No.: WO2012/161048
PCT Pub. Date: Nov. 29, 2012

(65) Prior Publication Data
US 2014/0087199 A1     Mar. 27, 2014

(30) Foreign Application Priority Data
May 23, 2011   (JP) .................................. 2011-114451

(51) Int. Cl.
C08J 7/04      (2006.01)
B32B 27/16    (2006.01)
(Continued)

(52) U.S. Cl.
CPC .................. *C08J 7/04* (2013.01); *B32B 27/16* (2013.01); *C08J 7/06* (2013.01); *C08J 7/123* (2013.01);
(Continued)

(58) Field of Classification Search
CPC ........ B05D 3/061; B05D 3/062; B05D 3/063; B29C 2035/0827
(Continued)

(56) References Cited

U.S. PATENT DOCUMENTS

| 6,507,031 B1 | 1/2003 | Jinbo et al. |
| 2004/0019143 A1* | 1/2004 | Koloski ................ C08F 283/00 524/434 |

(Continued)

FOREIGN PATENT DOCUMENTS

| JP | 2001-113163 A | 4/2001 |
| JP | 2003-161731 A | 6/2003 |

(Continued)

OTHER PUBLICATIONS

Machine translation of JP 2011-021091, retrieved Jun. 1, 2015.*
International Search Report; PCT/JP2012/062505; dated Jul. 3, 2012.

*Primary Examiner* — Dah-Wei D. Yuan
*Assistant Examiner* — Nga Leung V Law
(74) *Attorney, Agent, or Firm* — Studebaker & Brackett PC

(57) ABSTRACT

A self-assembled monolayer is formed on the surface of a molded article without roughening the surface of the molded article to thereby perform treatment for preventing a biochemical substance from being adsorbed, for example, on a microchip substrate, and imparting functionality of immobilizing a biofunctional molecule thereto. The surface of a cyclic olefin resin molded article, for example, a microchip substrate, is irradiated with vacuum ultraviolet light having a center wavelength of 172 nm from an excimer lamp to activate a portion serving as a flow channel in the substrate. Next, the molded is immersed in a tank filled, for example, with a fluorine compound solution, and a SAM film that is
(Continued)

a self-assembled monolayer is formed on the surface activated by ultraviolet radiation.

8 Claims, 18 Drawing Sheets

(51) Int. Cl.
 *C08J 7/06* (2006.01)
 *C08J 7/12* (2006.01)
(52) U.S. Cl.
 CPC .... *C08J 2323/24* (2013.01); *Y10T 428/31855* (2015.04)
(58) Field of Classification Search
 USPC .................................................. 427/553, 558
 See application file for complete search history.

(56) References Cited

U.S. PATENT DOCUMENTS

| | | | |
|---|---|---|---|
| 2005/0176003 A1 | 8/2005 | Yokoyama et al. | |
| 2006/0103848 A1 | 5/2006 | Nozawa et al. | |
| 2010/0012255 A1* | 1/2010 | Sekihara | B01L 3/502707 156/73.1 |
| 2010/0260975 A1* | 10/2010 | Sugimura | B29C 65/14 428/166 |

FOREIGN PATENT DOCUMENTS

| | | | |
|---|---|---|---|
| JP | 2005-257544 A | | 9/2005 |
| JP | 2006-145309 A | | 6/2006 |
| JP | 2008-019348 A | | 1/2008 |
| JP | 2010-241984 A | | 10/2010 |
| JP | 2011-021091 A | | 2/2011 |
| JP | 2011021091 A | * | 2/2011 |

* cited by examiner (a) Irradiation of substrate with excimer

A. Irradition

B. No Irradiation (b) Coating by immersing substrate in SAM solution

A. SAM coating

B. No coating (c) Immersion in fluorescent-labeled BSA solution (d) Fluorescence observation A. No emission B. Emission (a)

(b)

SURFACE TREATMENT METHOD FOR MOLDED ARTICLE, AND MOLDED ARTICLE PRODUCED FROM MATERIAL CONTAINING CYCLIC OLEFIN RESIN

FIELD OF THE INVENTION

The present invention relates to a surface treatment method for a molded article produced from a material containing a cyclic olefin resin, and a molded article produced from a material containing a cyclic olefin resin, and specifically relates to a surface treatment method for a molded article that includes performing treatment for preventing a biochemical substance from being adsorbed on a surface of a molded article, and a molded article.

DESCRIPTION OF THE RELATED ART

A cyclic olefin resin has been widely used for various uses due to its good melt processability, flowability, heat shrinkability, print properties, and the like. The use of cyclic olefin resin has been spreading in uses such as medical apparatuses, drugs, or optics, due to its good transparency, chemical resistance, moisture proof properties, and mechanical properties in addition to the aforementioned properties.

For the uses such as drugs or medical apparatuses, a molded article produced from a material containing a cyclic olefin resin has been used for a storage container for handling a substance (i.e., biochemical substance) derived from an organism such as proteins, an analysis device, or the like.

For example, for measurement using intermolecular interaction such as immune response in clinical examination or the like (for example, a surface plasmon resonance (SPR) measurement technique, a quartz crystal oscillator microbalance (OCM) measurement technique, a measurement technique using a functionalized surface from colloidal particles to superfine particles of gold, or the like), a microchip constructed of molded articles produced from a material containing a cyclic olefin resin is used.

A microchip may be adapted for various uses by providing a region having various functions, such as a reaction region in which a reagent is disposed, in a flow channel (also called a microchannel) provided in the microchip.

The microchip typically has a structure in which a pair of microchip substrates are adhered to each other so as to be opposed to each other, and a fine channel (for example, having a width of ten to several hundreds of micrometers, a depth of ten to several hundreds of micrometers) is formed on the surface of at least one of the microchip substrates. Recently, a microchip using a microchip substrate formed from a material containing a cyclic olefin resin which is light but less likely to be broken than a glass substrate, and inexpensive, and has high transmittance of ultraviolet light or the like has been developed.

In the case where a drug or a regent containing a biochemical substance in a relatively low concentration is handled, the biochemical substance may be adsorbed on the surface of a molded article produced from a material containing a cyclic olefin resin, thus causing a problem. For example, in microanalysis of a biological sample using a microchip constructed of molded articles, the influence of adsorption of a biochemical substrate on a cyclic olefin resin in the surface of a microchip substrate is so large that it cannot be ignored, and therefore it is difficult to obtain an accurate analysis result.

In other words, sensitivity of a detection part should be improved to increase accuracy of measurement using a microchip, but when a portion of a specimen is adsorbed on the surface of a flow channel (microchannel) before it reaches the detection part, the measurement accuracy may be reduced. In order to solve such a problem, a method of modifying the surface of the flow channel provided in the microchip so as not to adsorb a biological substance thereon has been required.

To cope with such a demand, a treatment method for preventing a biochemical substance from being adsorbed on the surface of a molded article produced from a material containing a cyclic olefin resin has been proposed as described in Patent Document 1.

In other words, in Patent Document 1, surface treatment including step 1 of 1) subjecting the surface of a molded article produced from a material containing a cyclic olefin resin to plasma discharge treatment, and then step 2 of 2) bringing the surface into contact with a strong acid after step 1 has been suggested.

Patent Document 1 further suggests that, subsequent to step 2, step 3 of 3) the surface is reacted with a specific fluorine-containing silane compound.

The surface of the molded article is activated by performing step 1 in Patent Document 1. Further, oxygen is introduced onto the activated surface by performing step 2. Still further, by performing step 3, a fluorine-containing group with low polarity is introduced onto the surface of the molded article to which oxygen has been introduced.

By the surface treatment by steps 1 and 2 described in Patent Document 1, adsorption of a biochemical substance on the surface of a molded article produced from a material containing a cyclic olefin resin is suppressed. Further, by subsequently performing the treatment of step 3, obstacles in biochemical analysis caused by non-specific adsorption of a positive ion substance, for example, a metal ion on the molded article may be eliminated.

PRIOR ART DOCUMENT

Patent Document

Patent Document 1: JP-A-2010-241984

SUMMARY OF THE INVENTION

Problems to be Solved by the Invention

As described above, according to the surface treatment method for a molded article produced from a material containing a cyclic olefin resin, which includes steps 1 and 2 or steps 1, 2 and 3 described in Patent Document 1, adsorption of a biochemical substance on the surface of the molded article is suppressed. Therefore, even in microanalysis of a biological sample using a microchip constructed of the molded articles, the aforementioned adsorption action is reduced and thus accuracy of analysis result is improved.

However, problems to be described below are still present in a series of the surface treatment steps described above.

Step 1 described in Patent Document 1 is a step of subjecting a molded article produced from a material containing a cyclic olefin resin to plasma discharge treatment. The surface of the molded article is subjected to plasma discharge treatment to be activated.

In other words, the surface of the molded article is irradiated with plasma particles by plasma discharge. At this time, high speed plasma particles collide with the surface of the molded article. As a result, the surface of the substrate is damaged, and thus the surface of the molded article is brought into a rough state.

Further, in order to achieve such an object, plasma discharge is performed in vacuum. Accordingly, a vacuum atmosphere should be formed for performing plasma discharge, and thus the facility for the surface treatment steps needs to be made large. Therefore, for example, a production process of a microchip constructed of molded articles produced from a material containing a cyclic olefin resin, which have been subjected to the surface treatment, is complicated and costly, and thus it is preferable to avoid the treatment in vacuum in the microchip production process.

Step 2 described in Patent Document 1 is a step of subjecting a molded article produced from a material containing a cyclic olefin resin to acid treatment.

With respect to the acid treatment, effects of corrosion to a human body as well as apparatus are considered, and there is also a problem that industrial waste liquid is caused. Further, a multi-functional microchip includes various sensor devices installed in one microchip. It is preferable that the acid treatment process be avoided such that the installed devices are not corroded by an acid.

A pair of microchip substrates as the molded article also is subjected to surface treatment through the aforementioned steps before the substrates are bonded to each other. Therefore, the surface of a fine flow channel formed in a microchip produced by bonding both substrates to each other is also subjected to the surface treatment.

In other words, the surface of the flow channel is in a rough state owing to plasma discharge treatment.

For example, a measurement will be considered in which a specific biological substance (for example, antibody) that is an analysis target is disposed in a flow channel of the microchip, a test solution containing a functional molecule (for example, antigen) with recognition function to the biological substance in the flow channel is fed thereto, and optical signals or electric signals changed by selective reaction and bonding of the functional molecule and the analysis target are detected and information-processed.

When the surface of the flow channel is rough as described above, the flow of functional molecule fed in the flow channel is not smooth, and thus the flow rate or the like is non-uniform in terms of time. Therefore, in some cases, it may be difficult to perform measurement with high accuracy due to a non-uniform flow rate or the like in terms of time.

The present invention has been made in view of the aforementioned situation, and an object of the present invention is to provide a surface treatment method for a surface of a molded article produced from a material containing a cyclic olefin resin, capable of forming a self-assembled monolayer on the surface of the molded article without roughening the surface, and making flow of a functional molecule in the flow channel smooth while avoiding roughening of the surface of the flow channel in the microchip, for example, even when a microchip substrate is molded as a molded article produced from a material containing a cyclic olefin resin, and to provide a molded article produced from a material containing a cyclic olefin resin which is subjected to treatment for preventing a biochemical substance from being adsorbed by the method.

Further, another object of the present invention is to provide a surface treatment method for a surface of a molded article produced from a material containing a cyclic olefin resin, capable of making the flow of a functional molecule in the flow channel smooth while avoiding roughening of the surface of the flow channel in the microchip, for example, even when a microchip substrate is molded as a molded article produced from a material containing a cyclic olefin resin, and to provide a molded article produced from a material containing a cyclic olefin resin which is provided with the functionality of immobilizing a biofunctional molecule thereto by the method.

Means for Solving the Problems

The present invention has been made in view of the aforementioned situation, and the problems are solved as follows.

In the surface treatment method for a molded article produced from a material containing a cyclic olefin resin of the present invention, a step of subjecting the surface of a molded article produced from a material containing a cyclic olefin resin to irradiation with vacuum ultraviolet light (hereinafter, step A) is employed instead of a conventional step (step 1) of subjecting the surface to plasma discharge treatment.

The surface is irradiated with vacuum ultraviolet light, specifically, light having a wavelength of 200 nm or less (preferably light having a wavelength of 180 nm or less). For example, as shown in embodiments to be described below, the surface is irradiated with monochromatic light having a center wavelength of 172 nm emitted from a vacuum ultraviolet excimer lamp.

Further, step B of forming a self-assembled monolayer is performed on the surface of the molded article which has been surface-treated by step A. In a self-assembled monolayer in which oxygen on the surface of a molded article produced from a cyclic olefin resin treated by step A is bonded to a functional group at a first end thereof, by selecting any functional group (for example, a carboxyl group, an amino group, or a methyl group) as a functional group at a second end, functionality may be imparted to the surface of a molded article produced from a cyclic olefin resin based on the function of each functional group. For example, by employing step 3 of reacting the surface of the molded article, which has been surface-treated by the aforementioned step, with a specific fluorine-containing silane compound as step B similarly to Patent Document 1, adsorption of a biochemical substance on the surface of a molded article may be suppressed.

The present inventors have intensively studied, and as a result found that step A used in the present invention largely exerts two effects.

(i) The surface of the molded article is activated by irradiating the surface of the molded article of a cyclic olefin resin with vacuum ultraviolet light similarly to the conventional plasma discharge treatment. Specifically, an olefin ring on the surface of the molded article is cleaved.

(ii) Further, introduction of oxygen to the activated surface of the molded article is also achieved by irradiation with vacuum ultraviolet light. In other words, it was recognized that the action of step 2 in the related art is also obtained.

In other words, in the present invention, the aforementioned problems are solved as follows.

(1) A surface treatment method for a surface of a molded article produced from a material containing a cyclic olefin resin, wherein the surface of the molded article produced from the material containing the cyclic olefin resin is irradiated with vacuum ultraviolet light and a self-assembled monolayer is formed on the irradiated surface.

(2) In the item (1), a portion of the surface is selectively irradiated with the vacuum ultraviolet light, and the self-assembled monolayer is formed on the selectively irradiated surface.

(3) In the item (2), two or more regions in the surface are irradiated with the vacuum ultraviolet light, and the self-assembled monolayers are formed on the plurality of irradiated regions.

(4) In the item (1), (2), or (3), the molded article is a microchip substrate including a first substrate and a second substrate, and a fine flow channel is formed in at least one of the first substrate and the second substrate.

(5) The surface treatment of a molded article of the item (1), (2), (3) or (4) is treatment for preventing a biochemical substance from being adsorbed on the surface of the molded article.

(6) In the item (5), the step of forming a self-assembled monolayer is a step of reacting the surface of the molded article with a fluorine compound represented by the following Formula [1]:

$(R^a)Si(R^b)_3$          [1]

[$R^a$ is a group selected from a fluorine-containing hydrocarbon group or a perfluoroalkyl group having 3 to 10 carbon atoms; and $R^b$ is a group selected from chlorine, bromine, iodine, a methoxy group, an ethoxy group, an n-propyloxy group, and an isopropyloxy group].

(7) A molded article produced from a material containing a cyclic olefin resin which is subjected to the treatment for preventing a biochemical substance from being adsorbed by the method of the item (5) or (6) is composed.

(8) A molded article produced from a material containing a cyclic olefin resin for a microchip substrate which is subjected to the treatment for preventing a biochemical substance from being adsorbed by the method of the item (5) or (6) is composed.

(9) The surface treatment of a molded article of the item (1), (2), (3) or (4) is treatment for imparting functionality of immobilizing a biofunctional molecule to the surface of the molded article.

(10) In the item (9), the step of forming a self-assembled monolayer is a step of reacting the surface of the molded article with an amino group-containing silane compound represented by the following Formula [2]:

$(NH_2)Si(R^c)_3$          [2]

[$R^c$ is a group selected from an amino group, a tosyl group, and a carboxyl group].

(11) A molded article produced from a material containing a cyclic olefin resin which is provided with the functionality of immobilizing a biofunctional molecule by the method of the item (9) or (10) is composed.

(12) A molded article produced from a material containing a cyclic olefin resin for a microchip substrate which is provided with the functionality of immobilizing a biofunctional molecule by the method of the item (9) or (10) is composed.

Effect of the Invention

According to the present invention, the following effects may be obtained.

(1) Since the surface of a molded article produced from a material containing a cyclic olefin resin is irradiated with vacuum ultraviolet light, a self-assembled monolayer may be formed on the surface of the molded article without roughening the surface of the molded article.

Therefore, for example, when microchip substrates are molded as a molded article produced from a material containing a cyclic olefin resin and the microchip substrates are bonded to each other to construct a microchip including a flow channel in which a specimen such as a functional molecule is fed, the surface of the flow channel in the microchip may be subjected to surface treatment for suppressing adsorption of a biochemical substance without roughening the surface of the flow channel in the microchip. Accordingly, the flow of the functional molecule fed in the flow channel is made smooth and thereby properties such as the flow rate of the functional molecule may be made uniform and measurement with high accuracy may be performed.

(2) Since the surface of a molded article produced from a material containing a cyclic olefin resin is irradiated with vacuum ultraviolet light and oxygen may be introduced onto the activated surface of the molded article, which corresponds to step 2 of the related art, there is no need for the conventional oxygen-introducing process. Therefore, simplification of process steps is achieved.

(3) The self-assembled monolayer may be selectively formed on a portion of the surface of the molded article due to treatment of irradiation with vacuum ultraviolet light. Accordingly, for example, the self-assembled monolayer may be formed only on a flow channel part in which a specimen is fed in the microchip substrate. Therefore, there are no problems at the time of joining of both microchip substrates.

(4) In the present invention, step B of forming the self-assembled monolayer is performed on the surface of the molded article which has been surface-treated by step A. As step B, for example, a step of reacting the surface of the molded article with a specific fluorine-containing silane compound is performed, and thereby obstacles in biochemical analysis caused by non-specific adsorption of a positive ion substance, for example, a metal ion on the molded article may be eliminated.

(5) In the present invention, step B' of forming the self-assembled monolayer is performed on the surface of the molded article which has been surface-treated by step A. As step B', for example, a step of reacting the surface of the molded article with a specific amino group-containing silane compound is performed, and thereby a biofunctional molecule such as an antibody may be immobilized on the surface of the molded article. Since the cyclic olefin resin is transparent, the aforementioned molded article may be applied to light transmission type measurement or fluorescent measurement, and may be expected for a wide variety of biosensing applications.

DESCRIPTION OF THE EMBODIMENTS

Figure 1:
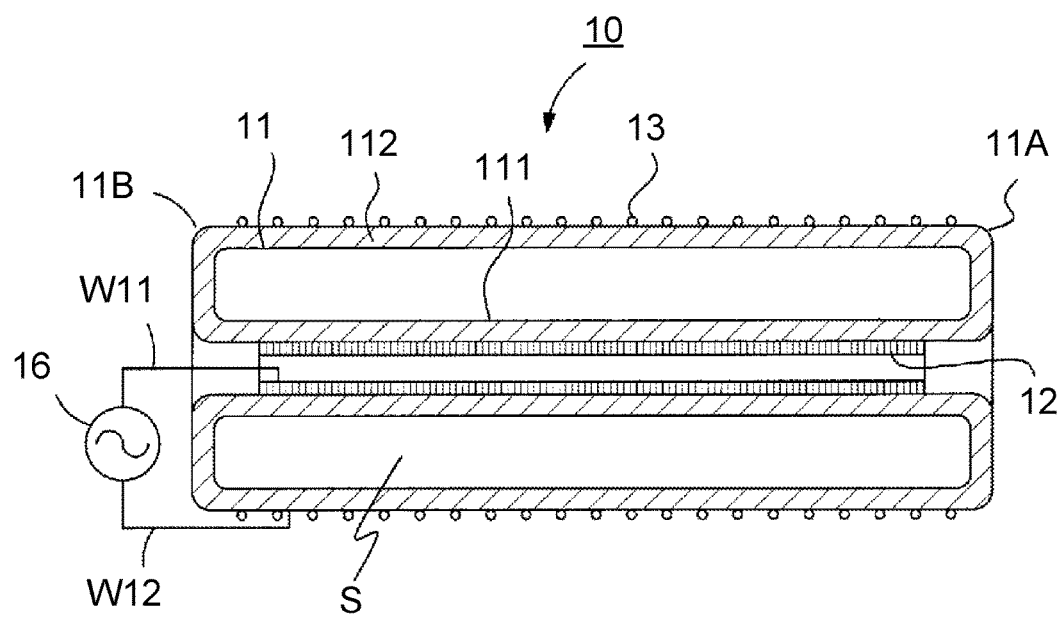
FIG. 1 shows a configuration example of an excimer lamp used for irradiation with vacuum ultraviolet light in the present invention.

Hereinafter, embodiments of the present invention will be described in detail, but the present invention is not limited thereto and may be changed appropriately within the scope of the object of the present invention. In addition, in the case where there is duplicated description, the description may be omitted as appropriate, which does not limit the subject matter of the present invention.

First, in the present specification, the biochemical substance refers to protein, enzyme, antibody, polypeptide, oligopeptide, amino acid, oligonucleotide, polynucleotide, nucleic acid, lipid, polysaccharide, oligosaccharide, amino sugar, microorganism, virus, or the like. The biochemical substance is not limited to a substance obtained from biological materials by a method such as extraction, and also includes a substance which is chemically synthesized in vitro.

Next, a molded article produced from a material containing a cyclic olefin resin used in the present invention will be described.

[Cyclic Olefin Resin]

The cyclic olefin resin is a polymer compound including a carbon-carbon bond as a main chain and a cyclic hydrocarbon structure in at least one portion of the main chain. The cyclic hydrocarbon structure is introduced by using, as a monomer, a compound (i.e., a cyclic olefin) having at least one olefinic double bond in a cyclic hydrocarbon structure, typified by norbornene or tetracyclododecene.

The cyclic olefin resin (A) is classified into an addition (co)polymer of cyclic olefins, or a hydrogenated product thereof (1), an addition copolymer of a cyclic olefin and an α-olefin, or a hydrogenated product thereof (2), and a ring-opening (co)polymer of a cyclic olefin, or a hydrogenated product thereof (3).

Specific examples of the cyclic olefin include monocyclic olefins such as cyclopentene, cyclohexene, cylcooctene; cyclopentadiene, and 1,3-cyclohexadiene;

bicyclic olefins such as bicyclo[2.2.1]hepta-2-ene (trivial name: norbornene), 5-methyl-bicyclo[2.2.1]hepta-2-ene, 5,5-dimethyl-bicyclo[2.2.1]hepta-2-ene, 5-ethyl-bicyclo[2.2.1]hepta-2-ene, 5-butyl-bicyclo[2.2.1]hepta-2-ene, 5-ethylidene-bicyclo[2.2.1]hepta-2-ene, 5-hexyl-bicyclo[2.2.1]hepta-2-ene, 5-octyl-bicyclo[2.2.1]hepta-2-ene, 5-octadecyl-bicyclo[2.2.1]hepta-2-ene, 5-methylidene-bicyclo[2.2.1]hepta-2-ene, 5-vinyl-bicyclo[2.2.1]hepta-2-ene, and 5-propenyl-bicyclo[2.2.1]hepta-2-ene;

tricyclic olefins such as tricyclo[4.3.0.12,5]deca-3,7-diene (trivial name: dicyclopentadiene), tricyclo[4.3.0.12,5]deca-3-ene; tricyclo[4.4.0.12,5]undeca-3,7-diene or tricyclo[4.4.0.12,5]undeca-3,8-diene or tricyclo[4.4.0.12,5]undeca-3-ene as a partially hydrogenated product thereof (or an adduct of cyclopentadiene and cyclohexene); 5-cyclopentyl-bicyclo[2.2.1]hepta-2-ene, 5-cyclohexyl-bicyclo[2.2.1]hepta-2-ene, 5-cyclohexenylbicyclo[2.2.1]hepta-2-ene, and 5-phenyl-bicyclo[2.2.1]hepta-2-ene;

tetracyclic olefins such as tetracyclo[4.4.0.12,5.17,10]dodeca-3-ene (simply referred to as tetracyclododecene), 8-methyltetracyclo[4.4.0.12,5.17,10]dodeca-3-ene, 8-ethyltetracyclo[4.4.0.12,5.17,10]dodeca-3-ene, 8-methylidenetetracyclo[4.4.0.12,5.17,10]dodeca-3-ene, 8-ethylidenetetracyclo[4.4.0.12,5.17,10]dodeca-3-ene, 8-vinyltetracyclo[4,4.0.12,5.17,10]dodeca-3-ene, and 8-propenyl-tetracyclo[4.4.0.12,5.17,10]dodeca-3-ene;

polycyclic olefins such as 8-cyclopentyl-tetracyclo[4.4.0.12,5.17,10]dodeca-3-ene, 8-cyclohexyl-tetracyclo[4.4.0.12,5.17,10]dodeca-3-ene, 8-cyclohexenyl-tetracyclo[4.4.0.12,5.17,10]dodeca-3-ene, 8-phenyl-cyclopentyl-tetracyclo[4.4.0.12,5.17,10]dodeca-3-ene; tetracyclo[7.4.13,6.01,9.02,7]tetradeca-4,9,11,13-tetraene (also referred to as 1,4-methano-1,4,4a,9a-tetrahydrofluorene), tetracyclo[8.4.14,7.01,10.03,8]pentadeca-5,10,12,14-tetraene (also referred to as 1,4-methano-1,4,4a,5,10,10a-hexahydroanthracene); pentacyclo[6.6.1.13,6.02,7.09,14]-4-hexadecene, pentacyclo[6.5.1.13,6.02,7.09,13]-4-pentadecene, pentacyclo[7.4.0.02,7.13,6.110,13]-4-pentadecene; heptacyclo[8.7.0.12,9.14,7.111,17.03,8.012,16]-5-eicosene, heptacyclo[8.7.0.12,9.03,8.14,7.012,17.113,16]-14-eicosene; and a tetramer of cyclopentadiene. These cyclic olefins may be used alone or in combination of two or more.

Specific example of the α-olefin copolymerizable with the cyclic olefin include ethylene, α-olefins, or the like, having 2 to 20 carbon atoms, preferably 2 to 8 carbon atoms, such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene. These α-olefins may be used alone or in combination of two or more.

The polymerization method of a cyclic olefin, or of a cyclic olefin and an α-olefin, and the hydrogenation method of the obtained polymer are not specifically limited, and the polymerization and hydrogenation may be performed according to publicly known methods.

The cyclic olefin resin is preferably an addition copolymer of ethylene and norbornene, or an addition copolymer of ethylene and tetracyclododecene.

The structure of the cyclic olefin resin is not specifically limited, but may be a chain structure, a branched structure, or a cross-linked structure, and is preferably a straight-chain structure.

Further, the cyclic olefin resin containing, as a polymerization component, a cyclic olefin component used in the present invention may be a commercially available resin. Examples of the commercially available cyclic olefin resin include TOPAS (registered trademark, manufactured by Topas Advanced Polymers GmbH), Apel (registered trademark, manufactured by Mitsui Chemicals, Inc.), Zeonex (registered trademark, manufactured by Zeon Corporation), Zeonor (registered trademark, manufactured by Zeon Corporation), and Arton (registered trademark, manufactured by JSR Corporation).

[Other Components]

In the present invention, the cyclic olefin resin may be used as a composition which contains other thermoplastic resins of types and amounts that do not hinder the object of the present invention. A resin composition containing the cyclic olefin resin and other thermoplastic resins may be prepared by melt-kneading the resins using, for example, a uniaxial or biaxial extruder.

In the present invention, the cyclic olefin resin may contain various additives such as an antioxidant, a weathering stabilizer, an ultraviolet absorber, an antibacterial agent, a flame retardant, and a coloring agent of types and amounts that do not hinder the object of the present invention. In the case where the cyclic olefin resin contains an additive, for example, the resin composition may be prepared by melt-kneading the cyclic olefin resin and the additive using a uniaxial or biaxial extruder.

[Molded Article]

The molded article subjected to treatment for preventing a biological substance from being adsorbed by the method of the present invention is produced by molding the cyclic olefin resin by a publicly known method. Examples of the publicly known molding method include injection molding, injection compression molding, gas assisted injection molding, extrusion molding, multilayer extrusion molding, rotating molding, thermal press molding, blow molding, and foam molding.

The shape of the molded article produced from a material containing the cyclic olefin resin is not specifically limited. For example, the molded article may be a general-purpose product such as a film, a sheet, a tube, a pipe, or a bottle, or a molded article designed in accordance with a specific use such as a plastic substrate for a microchip.

The molded article is preferably a plastic substrate for a microchip used for analysis of a sample containing a biochemical substance. In the case where the molded article is a plastic substrate for a microchip, by treating the surface of the molded article by the method of the present invention, the molded article has a significant effect of preventing the biochemical substance from being adsorbed.

Hereinafter, with respect to embodiments of the present invention, 1) step A of irradiating the surface of the cyclic olefin resin molded article with vacuum ultraviolet light in order to activate the surface, and 2) step B of forming a self-assembled monolayer on the surface of the molded article which has been surface-treated by step A will be described in order. In addition, as step B, an example of reacting the activated surface of the molded article with a specific fluorine-containing silane compound will be described.

[Step A]

Step A is a step of irradiating the surface of the cyclic olefin resin molded article with vacuum ultraviolet light. The surface is activated by irradiation with vacuum ultraviolet light.

As a light source, for example, an excimer lamp emitting vacuum ultraviolet light having a center wavelength of 172 nm is used.

FIG. 1 shows a configuration example of an excimer lamp. The excimer lamp has a tubular structure, and FIG. 1 shows a cross-sectional view taken at a flat surface including a tube axis. The excimer lamp 10 includes a container (light-emitting tube) 11 having a substantially double tube structure of an inner tube 111 and an outer tube 112 which are substantially concentrically arranged, and the container 11 is sealed at both end parts 11A and 11B to form a cylindrical discharge space S therein.

A rare gas such as xenon, argon, or krypton is enclosed in the discharge space S. The container 11 is formed of quartz glass. An inner electrode 12 is provided on the inner peripheral surface of the inner tube 111, and a grid-shaped outer electrode 13 is provided on the outer peripheral surface of the outer tube 112. The electrodes 12 and 13 are disposed with the container 11 and the discharge space S interposed therebetween. The electrodes 12 and 13 are connected to a power supply device 16 through lead wires W11 and W12.

When a high frequency voltage is applied by the power supply device 16, discharge (so called dielectric barrier discharge) is formed between the electrode 12 and the electrode 13 with the dielectrics 111 and 112 interposed therebetween, vacuum ultraviolet light having a center wavelength of 172 nm is generated in the case of a xenon gas, and the vacuum ultraviolet light is emitted to the outside.

Figure 2:
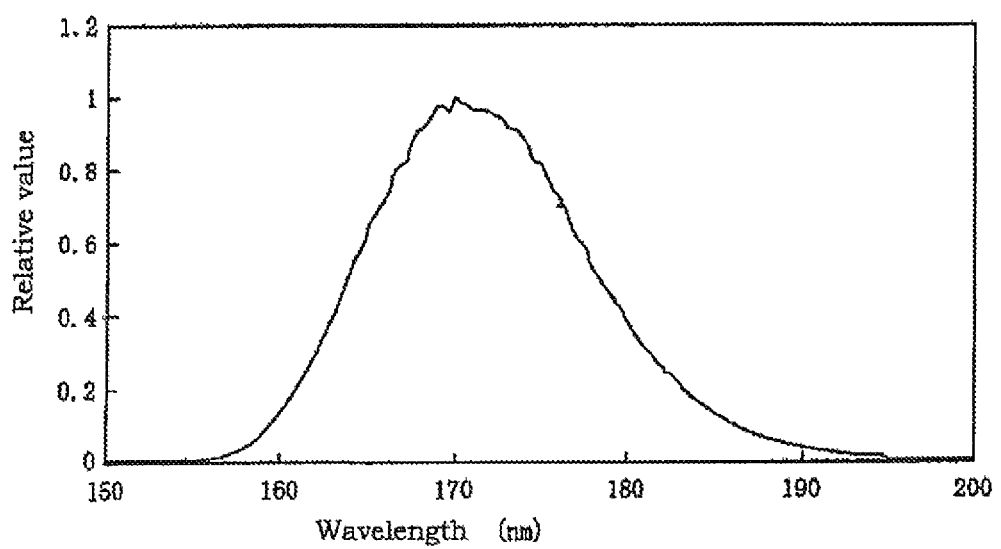
FIG. 2 shows the distribution of the emission wavelength of the excimer lamp shown in FIG. 1.

FIG. 2 shows the distribution of the emission wavelength of the excimer lamp 10 shown in FIG. 1 when the lamp is lighted at a frequency of 20 KHz and a tube wall load of 0.1 W/cm$^2$. The horizontal axis shows emission wavelength and the longitudinal axis shows the relative value to the intensity of light having a wavelength of 170 nm.

Figure 3:
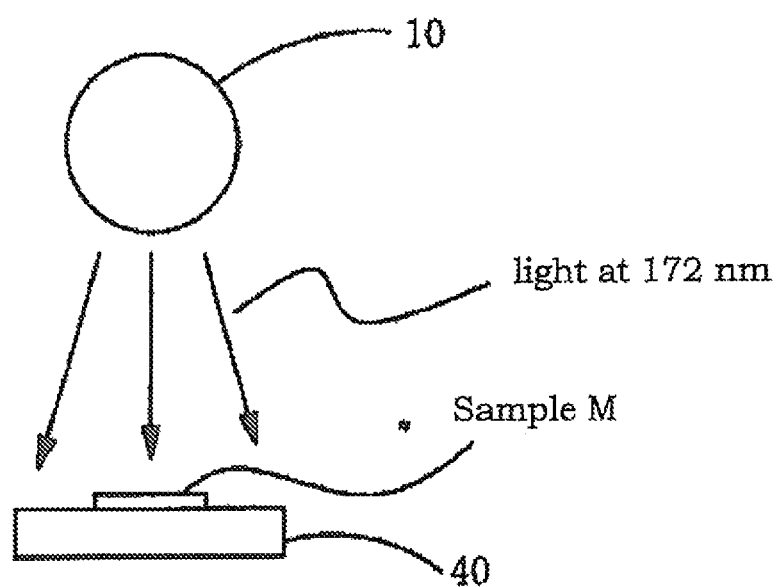
FIG. 3 is a schematic diagram of an experimental system at the time of investigating the surface condition of a sample containing a cyclic olefin resin by irradiation with vacuum ultraviolet light.

FIG. 3 shows a schematic diagram of an experimental system. As shown in FIG. 3, a sample M on a work stage 40 was irradiated with vacuum ultraviolet light from the excimer lamp 10. As the excimer lamp, the aforementioned excimer lamp which emits vacuum ultraviolet light having a center wavelength of 172 nm was used, and the irradiance on the surface of the sample was 20 mW/cm$^2$.

The sample is a substrate which is a molded article formed using TOPAS 8007S-04 (manufactured by Polyplastics Co., Ltd.) as the cyclic olefin resin and has a square shape of a thickness of 10 mm, a length of 100 mm, and a width of 100 mm.

The surface of the cyclic olefin resin molded article as a sample was irradiated with vacuum ultraviolet light under the aforementioned conditions, and then the surface condition of the molded article was investigated. Specifically, X-ray electron spectroscopy (XPS) of the surface of the cyclic olefin resin molded article was performed using an XPS device (XPS-7000 type, manufactured by Rigaku Corporation) before and after irradiation with vacuum ultraviolet light.

Figure 4:
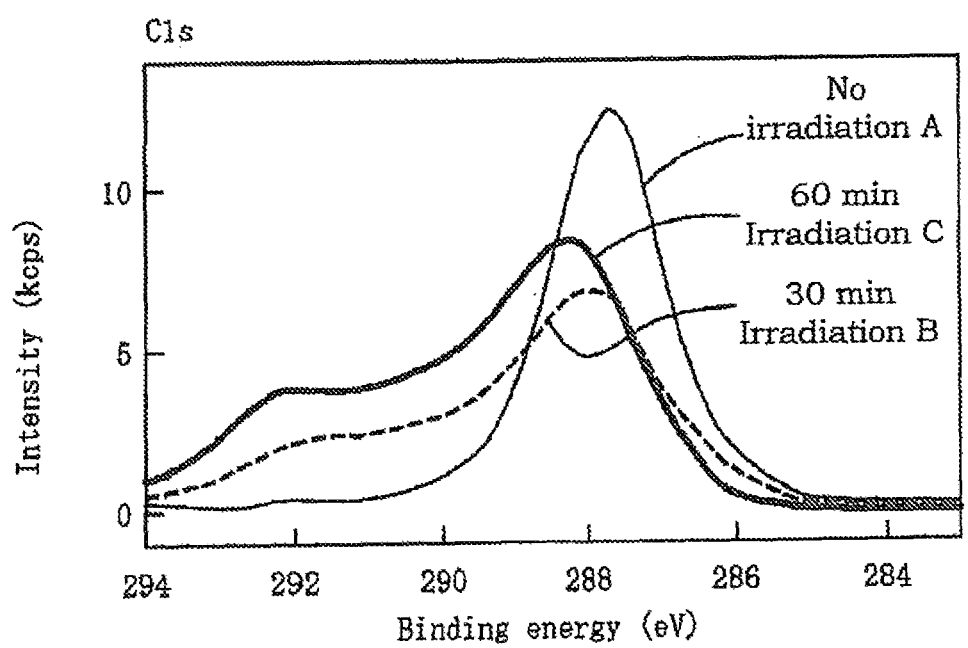
FIG. 4 shows an XPS measurement result for a C1s peak before and after irradiation with vacuum ultraviolet light.
Figure 5:
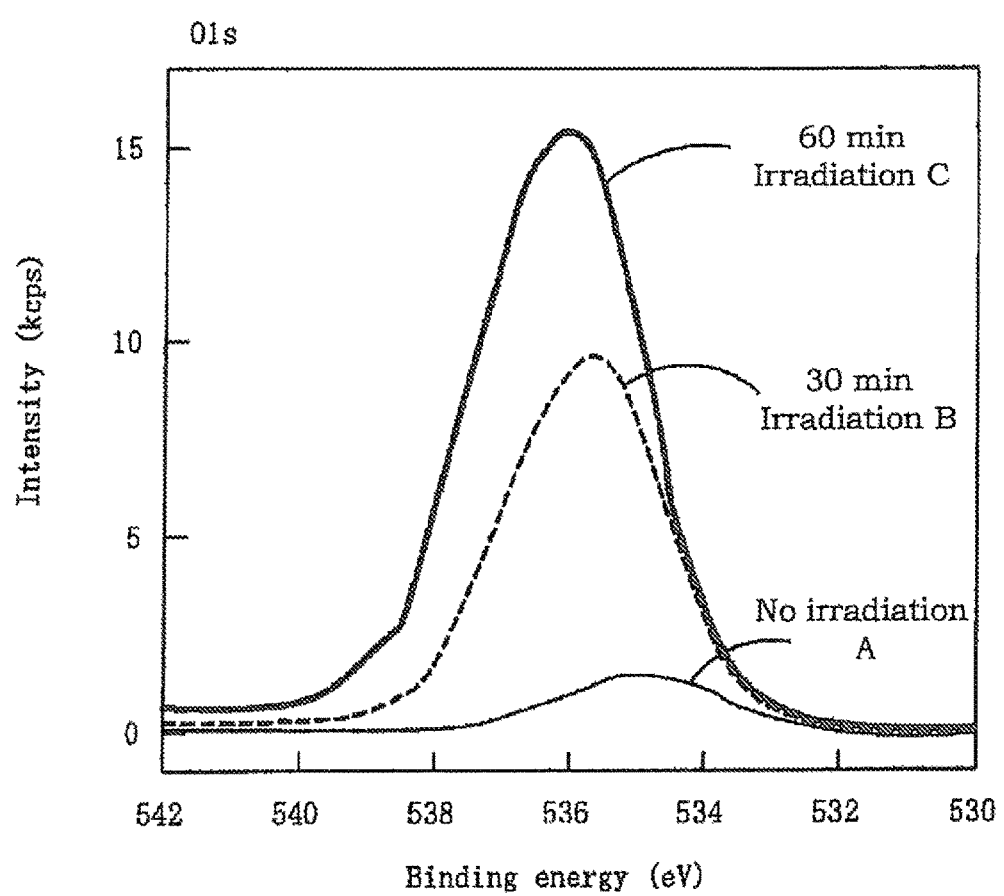
FIG. 5 shows an XPS measurement result (2) for an O1s peak before and after irradiation with vacuum ultraviolet light.

The XPS measurement results are shown in FIGS. 4 and 5. FIG. 4 shows a measurement result for a C1s peak of carbon and FIG. 5 shows a measurement result for an O1s peak of oxygen, and the longitudinal axis of FIG. 4 and that of FIG. 5 show the intensity of the binding energy.

As shown in FIGS. 4 and 5, XPS measurement was performed before the irradiation with vacuum ultraviolet light having a center wavelength of 172 nm, after 30 minutes of the irradiation, and after 60 minutes of the irradiation. In FIGS. 4 and 5, "A" shows no irradiation, "B" shows 30 minutes of the irradiation, and "C" shows 60 minutes of the irradiation, respectively.

From the measurement of C1s shown in FIG. 4, a peak of a structure which may be derived from one epoxy was obtained before irradiation with vacuum ultraviolet light. Further, when the surface of the molded article was irradiated with vacuum ultraviolet light for 30 minutes and 60 minutes, one peak of carbon observed before irradiation with vacuum ultraviolet light was divided into two peaks. This is probably because the olefin ring was cleaved due to irradiation of the surface of the cyclic olefin resin molded article with vacuum ultraviolet light.

Meanwhile, from the measurement for O1s shown in FIG. 5, a peak of oxygen was obtained before irradiation with vacuum ultraviolet light. Since oxygen is not included in the structure of the cyclic olefin resin itself, it is considered that the surface of the original cyclic olefin resin molded article was slightly covered with an oxide coat.

Further, when the surface of the molded article was irradiated with vacuum ultraviolet light for 30 minutes and 60 minutes, one peak of oxygen observed before irradiation with vacuum ultraviolet light was increased significantly. In other words, it was recognized that oxygen is introduced onto a surface of a molded article produced from a cyclic olefin resin when the surface is irradiated with vacuum ultraviolet light in the atmosphere.

In conclusion, the surface treatment for the cyclic olefin resin molded article by step A of irradiating the surface of the cyclic olefin resin molded article with vacuum ultraviolet light results in activation of the surface and introduction of oxygen to the activated surface. Judging from the XPS measurement results, it is considered that according to step A, the surface is activated (specifically, an olefin ring on the surface is cleaved) and oxygen is introduced onto the surface.

[Step B]

Next, step B will be described.

Step B is a step of reacting the surface of the molded article activated by step A with a fluorine compound represented by the following Formula (1). In the present invention, the oxygen-containing group introduced onto the surface of the molded article by step A is reacted with a fluorine compound represented by Formula (1) so that a fluorine-containing group with low polarity is introduced onto the surface of the molded article, and therefore adsorption of a biochemical substance is prevented.

In the present invention, a fluorine compound represented by the following Formula (1) is used as a surface treatment agent for the molded article produced from a material containing a cyclic olefin resin. Several fluorine compounds represented by Formula (1) may be used in combination.

$(R^a)Si(R^b)_3$      (1)

[$R^a$ is a group selected from a fluorine-containing hydrocarbon group or a perfluoroalkyl group having 3 to 10 carbon atoms; and $R^b$ is a group selected from chlorine, bromine, iodine, a methoxy group, an ethoxy group, an n-propyloxy group, and an isopropyloxy group.]

Specific examples of the $R^a$ group include a 3,3,3-trifluoropropyl group, a 2,2,3,3,3-pentafluoropropyl group, a 3,3,4,4,5,5,6,6,6-nonafluorohexyl group, a perfluoropropyl group, a perfluorobutyl group, a perfluorohexyl group, a perfluorooctyl group, and a perfluorodecyl group.

Among the fluorine compounds represented by Formula (1), preferable fluorine compounds include fluoroalkyl trihalosialnes such as 3,3,3-trifluoropropyl trichlorosilane, 2,2,3,3,3-pentafluoropropyl trichlorosilane, 1H,1H,2H,2H-perfluorodecyl dimethyl chlorosilane, 1H,1H,2H,2H-perfluorodecyl methyl dichlorosilane, 1H,1H,2H,2H-perfluorodecyl trichlorosilane, 1H,1H,2H,2H-perfluorooctyl dimethyl chlorosilane, 1H,1H,2H,2H-perfluorooctyl methyl dichlorosilane, 1H,1H,2H,2H-perfluorooctyl trichlorosilane, 3,3,4,4,5,5,6,6,6-nonafluorohexyl trichlorosilane, and 3,3,4,4,5,5,6,6,6-nonafluorohexyl methyl dichlorosilane; and fluoroalkyl trialkoxysilanes such as 3,3,3-trifluoropropyl triethoxysilane, 2,2,3,3,3-pentafluoropropyl triethoxysilane, perfluoromethyl triethoxysilane, 1H,1H,2H,2H-perfluorodecyl triethoxysilane, 1H,1H,2H,2H-perfluorooctyl triethoxysilane, and 1H,1H,2H,2H-perfluorooctyl trimethoxysilane.

[Treatment by Fluorine Compound]

The method of reacting the surface of the molded article activated by performing step A with the fluorine compound represented by Formula (1) is not specifically limited so long as the reaction well proceeds. The fluorine compound represented by Formula (1) is preferably a fluorine compound solution diluted with an organic solvent such as methanol or ethanol. The concentration of the fluorine compound solution is preferably in a range of 0.01 mM to 10 mM. When the concentration of the fluorine compound in the fluorine compound solution is excessively low, an effect of preventing the adsorption of a biochemical substance may not be obtained sufficiently or it may take a long period of time to perform the reaction.

Examples of a specific method of reacting the surface of the molded article with the fluorine compound include a method of immersing the molded article in the fluorine compound solution, a method of feeding the fluorine compound solution to the surface of the molded article, and a method of coating the surface of the molded article with the fluorine compound solution. Among these methods, the method of immersing the molded article in the fluorine compound solution and the method of feeding the fluorine compound solution to the surface of the molded article are preferable because the operation is simple and the surface of the molded article may be treated uniformly.

Reaction conditions of the surface of the molded article with a fluorine compound are not specifically limited so long as the reaction well proceeds. Generally, the reaction of the surface of the molded article with a fluorine compound is performed under conditions of a temperature of 0° C. to 50° C., preferably 15 to 35° C. and 15 minutes to 12 hours, preferably 30 minutes to 2 hours.

The surface of the cyclic olefin resin molded article treated by step A was subjected to the following treatment as step B, and then the surface condition of the cyclic olefin resin molded article treated by step B was investigated.

The sample is a substrate which is a molded article formed using TOPAS 8007S-04 (manufactured by Polyplastics Co., Ltd.) as the cyclic olefin resin and has a square shape of a thickness of 10 mm, a length of 10 mm, and a width of 10 mm. As the treatment of step A, vacuum ultraviolet light having a center wavelength of 172 nm was emitted for 15 minutes to 60 minutes using the excimer lamp described above. Here, the irradiance on the surface of the sample was 10 mW/cm² to 20 mW/cm².

Subsequently, as step B, the sample treated as described above was immersed in an ethanol solution having a concentration of 0.0001 M to 0.005 M of perfluorobutyl trichlorosilane for 1 hour at room temperature.

With respect to investigation of the surface condition of the sample treated by step B, X-ray electron spectroscopy (XPS) of the surface of the molded article was performed using an XPS device (XPS-7000 type, manufactured by Rigaku Corporation) similarly to the above.

Binding of oxygen and binding of the fluorine compound of Formula (1) to the surface of the molded article may be identified by a peak around 537 eV assigned to O1s, and a peak around 690 eV assigned to F1s, respectively, by X-ray photoelectron spectroscopy (XPS) measurement.

Figure 6:
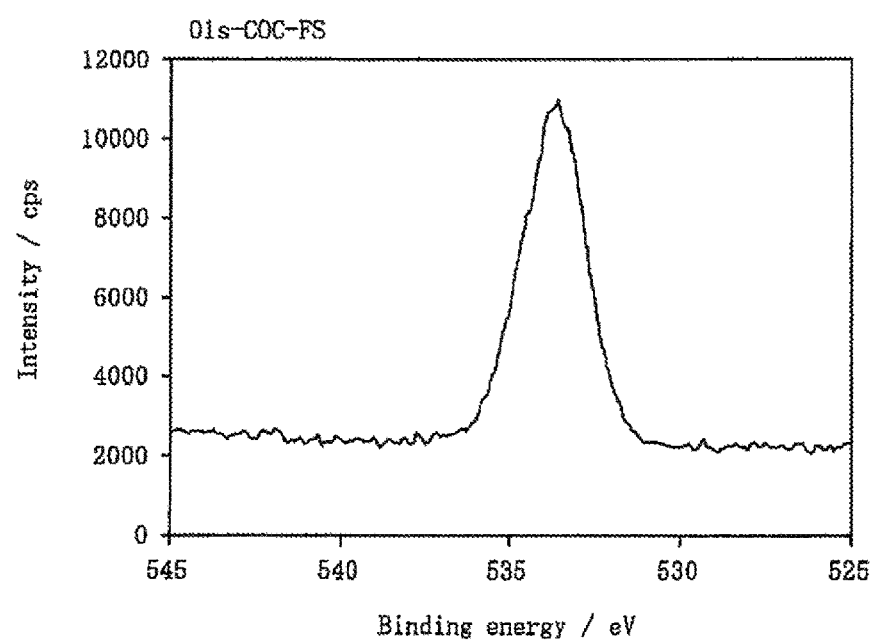
FIG. 6 shows an XPS measurement result for an O1s peak after reaction with a fluorine compound.
Figure 7:
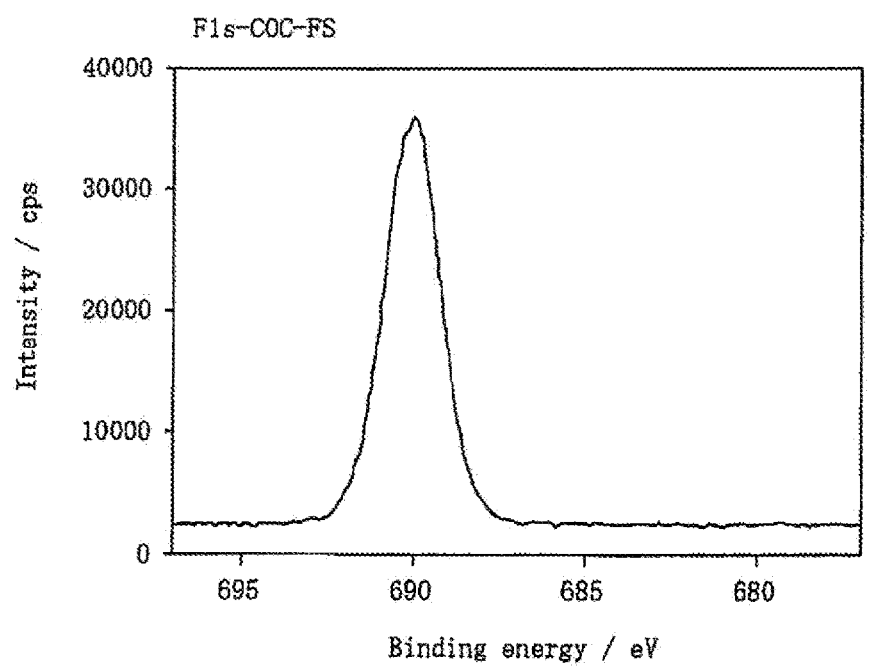
FIG. 7 shows an XPS measurement result for an F1s peak after treatment of reaction with a fluorine compound.

FIG. 6 shows an XPS measurement result in a binding energy region corresponding to an O1s peak of the plate treated by step B and FIG. 7 shows an XPS measurement result in a binding energy region corresponding to an F1s peak of the plate treated by step B. From a peak corresponding to O—Si bond observed in FIG. 6 and a peak corresponding to $CF_2$ observed in FIG. 7, it was shown that a carbon fluoride group was introduced onto the surface of the plate (the surface of the cyclic olefin resin molded article).

In other words, by performing treatment of step B, a self-assembled monolayer was formed on the surface of the molded article produced from the cyclic olefin resin, such that oxygen on the surface of the molded article produced from the cyclic olefin resin treated by step A is bonded to a silane group of perfluorobutyl trichlorosilane and a carbon fluoride group is included as a functional group at a second end thereof.

Next, adsorptivity of a biological substance on the surface of the molded article produced from the cyclic olefin resin treated by steps A and B was investigated.

The investigation was performed with respect to the molded article produced from a cyclic olefin resin not having been subjected to the surface treatment of the present invention and the molded article plate having been subjected to the surface treatment of the present invention (treatment of step A and then treatment of step B).

Figure 8:
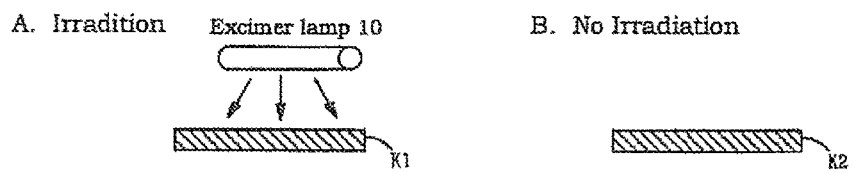
FIG. 8 shows a specific procedure for investigating adsorptivity of a biological substance.
Figure 8:
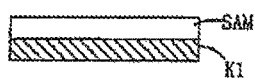
Figure 8:
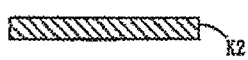
Figure 8:
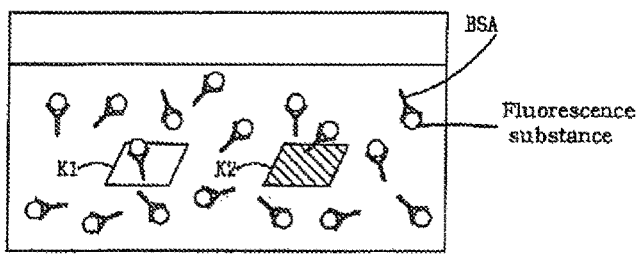
Figure 8:
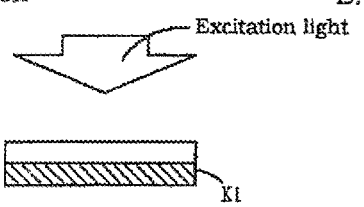
Figure 8:
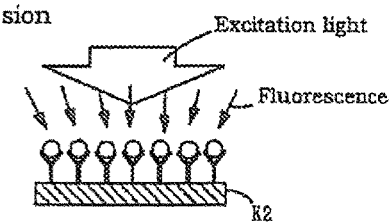

A specific procedure of investigation is shown in FIG. 8.

As shown in FIG. 8, plate-like substrates (plates) K1 and K2 were formed as the molded articles, the substrate K1 was irradiated with vacuum ultraviolet light from an excimer lamp 10 (see FIG. 8(a)), and immersed in a fluorine compound solution (a SAM solution) to be reacted with the solution so that the substrate K1 was coated with a self-assembled monolayer (hereinafter, also referred to as a "SAM film") having a carbon fluoride group as a functional group (see FIG. 8(b)).

Both the untreated substrate K2 (FIG. 11) and the substrate K1 (FIG. 10) having been subjected to the surface treatment of the present invention were immersed overnight in 100 ppm of fluorescent-labeled bovine serum albumin (manufactured by Aldrich Chemical Company Inc.) solution (fluorescent-labeled BSA solution) diluted with a phosphate buffer solution, and then sufficiently washed with ultrapure water (see FIG. 8(c)).

The surfaces of both the substrates K1 and K2 after washing were irradiated with a handy UV lamp (UVGL-58, 365 nm long wavelength type, manufactured by UVP Inc.) and then fluorescence was observed at 440 nm (see FIG. 8(d)).

The investigation was performed by separately preparing three sheets of the substrates K1 having been subjected to the surface treatment of the present invention and three sheets of the untreated substrates K2 for reproducibility.

As a result of observation of the untreated substrates K2 and the substrates K1 having been subjected to the surface treatment of the present invention, fluorescence was observed at 440 nm on the surfaces of all the untreated substrates K2, and thus it was identified that aggregates of fluorescent-labeled bovine serum albumin were present on the surface.

Further, fluorescence was not observed on the surfaces of all the substrates K1 having been subjected to the surface treatment of the present invention, and thus it was found that fluorescent-labeled bovine serum albumin was not present at all.

From the results, it was identified that adsorption of bovine serum albumin is suppressed by performing the surface treatment of the present invention.

According to the present invention, by performing step A of irradiating the molded article produced from the cyclic olefin resin with vacuum ultraviolet light in the atmosphere, the surface of the molded article may be activated (specifically an olefin ring on the surface may be cleaved) and oxygen may be introduced onto the activated surface of the molded article.

Therefore, there is no need for the oxygen introduction process described in Patent Document 1, and thus simplification of process steps may be achieved.

Further, when the surface of the molded article produced from a cyclic olefin resin is activated by step A, the surface of the molded article is not roughened, unlike the case of plasma discharge treatment.

Therefore, for example, when microchip substrates are molded as the molded article produced from a material containing a cyclic olefin resin and the microchip substrates are bonded to each other to construct a microchip including a flow channel in which a specimen such as a functional molecule is fed, the surface of the flow channel in the microchip is prevented from roughening, and thus flow of the functional molecule fed in the flow channel is made smooth. Therefore, properties such as the flow rate of the functional molecule may be made uniform, and thus measurement with high accuracy may be performed.

Further, by performing treatment of step A and then treatment of step B, a self-assembled monolayer containing oxygen as a primer may be formed on the surface of the molded article. In other words, the self-assembled monolayer may be formed in which oxygen on the surface of the molded article produced from a cyclic olefin resin subjected to treatment of step A is bonded to a functional group at a first end thereof, and thus functionality may be imparted to the surface of the molded article produced from a cyclic olefin resin based on the function of a functional group at a second end of the self-assembled monolayer.

By employing a carbon fluoride group as a functional group at the second end of the self-assembled monolayer and introducing the carbon fluoride group onto the surface of the molded article, non-specific adsorption of a biochemical substance may be prevented, and non-specific adsorption of a positive ion substance on the surface of the molded article may be suppressed.

The molded article surface-treated by the aforementioned method has largely reduced adsorptivity of a biochemical substance that is a polar material. For this reason, the molded article surface-treated by the method of the present invention is preferably used for uses employing the biochemical substance such as protein, enzyme, antibody, polypeptide, oligopeptide, amino acid, oligonucleotide, polynucleotide, nucleic acid, lipid, polysaccharide, oligosaccharide, amino sugar, microorganism, and virus.

Particularly, when the surface of a substrate for a microchip used for microanalysis or the like of a sample containing a biochemical substance is treated by the method of the present invention, adsorption of the biochemical substance in the sample on the surface of the substrate is significantly suppressed, and thus a high performance microchip with high analysis accuracy may be obtained.

In other words, according to the method described above, the following effects are obtained.

(1) According to the surface treatment method for the molded article produced from a material containing a cyclic olefin resin by step A, similarly to the related art, adsorption of a biochemical substance on the surface of the molded article may be suppressed. Further, the surface of the molded article is not roughened by employing step A, unlike the case of plasma discharge treatment. Therefore, for example, when microchip substrates are formed as a molded article produced from a material containing a cyclic olefin resin and the microchip substrates are bonded to each other to construct a microchip including a flow channel in which a specimen such as a functional molecule is fed, the surface of the flow channel in the microchip is prevented from roughening, and thus flow of the functional molecule fed in the flow channel is made smooth. Therefore, properties such as the flow rate of the functional molecule may be made uniform, and thus measurement with high accuracy may be performed.

(2) Further, in step A of the present invention, since oxygen is introduced onto the activated surface of the molded article, which corresponds to step 2 of the related art, there is no need for the conventional oxygen-introducing process. Therefore, simplification of process steps is achieved.

(3) According to the present invention, step B of forming a self-assembled monolayer is performed on the surface of the molded article which has been surface-treated by step A. By performing step B, for example, a step of reacting the surface of the molded article with a specific fluorine-containing silane compound, obstacles in biochemical analysis caused by non-specific adsorption of a positive ion substance such as a metal ion on the molded article may be eliminated.

In addition, in the description of embodiments above, formation of the self-assembled monolayer of step B is described with respect to an example of reacting the surface of the molded article produced from a cyclic olefin resin treated by step A with a fluorine compound, but the present invention is not limited thereto. In other words, by selecting any functional group (for example, a carboxyl group, an amino group, a methyl group, or the like) as a functional group at a second end of a self-assembled monolayer in which oxygen on the surface of a molded article produced from a cyclic olefin resin treated by step A is bonded to a functional group at a first end thereof, functionality based on function of the selected functional group may be imparted to the surface of the molded article produced from a cyclic olefin resin.

Figure 9:
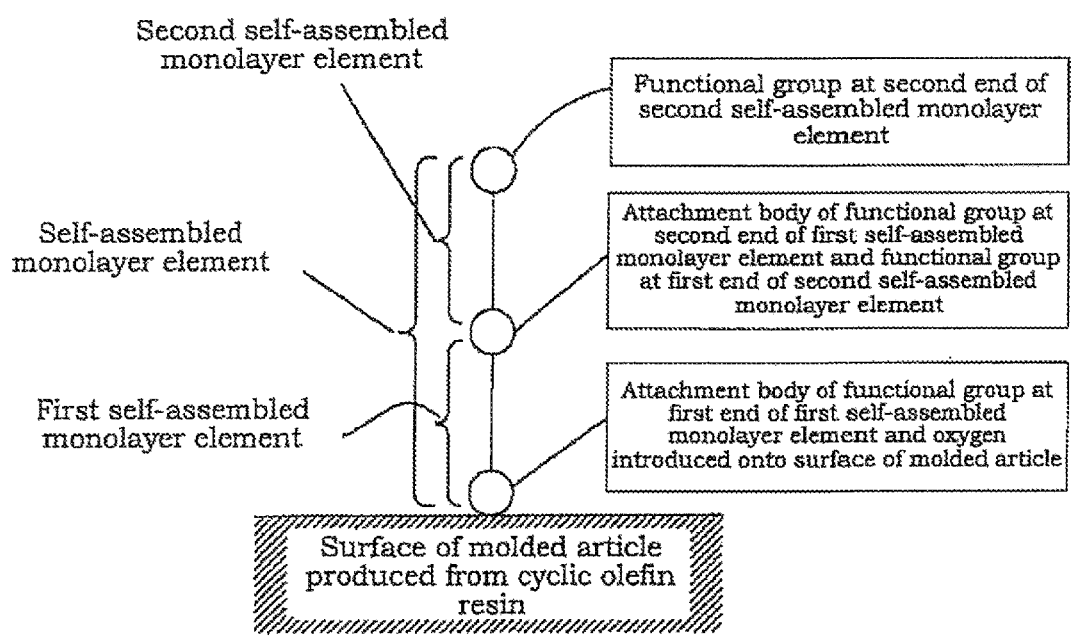
FIG. 9 is a diagram illustrating a case of stacking self-assembled monolayers to form a self-assembled monolayer with high molecular weight.

Further, as shown in FIG. 9, the first self-assembled monolayer thus formed is specified as a self-assembled monolayer element and another self-assembled monolayer is formed thereon and is specified as a second self-assembled monolayer element. As a result, a self-assembled monolayer with high molecular weight including the first self-assembled monolayer element and the second self-assembled monolayer element may be formed.

In other words, the self-assembled monolayers may be stacked to each other to form a self-assembled monolayer with high molecular weight macroscopically. Needless to say, there may be three or more self-assembled monolayer elements specified as described above.

[Example of Imparting Functionality of Immobilizing a Biofunctional Molecule to the Surface of a Molded Article Produced from a Cyclic Olefin Resin]

In the aforementioned embodiments, an example is shown in which the surface of the molded article produced from a cyclic olefin resin treated by step A is reacted with a fluorine compound in order to form the self-assembled monolayer of step B. However, in the following embodiments, an example is shown in which the surface of the molded article produced from a cyclic olefin resin treated by step A is reacted with a silane compound having an amine end, a tosyl end or a carboxyl end in order to form the self-assembled monolayer. Hereinafter, a step of reacting the silane compound with the surface of the molded article is referred to as step B'.

Conventionally, a self-assembled monolayer is formed using a functional alkanethiol on the surface of a gold (Au) substrate, and a biofunctional molecule is immobilized using the self-assembled monolayer. According to the method, the immobilization amount and orientation of a biofunctional molecule may be controlled on a gold substrate. Therefore, the gold substrate thus constructed may be used as a sensing substrate with very high reactivity.

However, since the gold substrate has low light transmission properties, it is very difficult that the gold substrate is applied to light transmission type measurement using ultraviolet or visible light. Further, since gold has a nature of fluorescence quenching, it cannot be applied to fluorescence analysis.

Therefore, in conventional bioanalysis, the biofunctional molecule is immobilized to the surface of a polymer material physically immobilized to the molded article of a resin such as polypropylene for application to sensing of the biofunctional molecule. For example, when a microplate having 96 wells made from polypropylene is used, a polymer material is fed in each well, an antibody is immobilized to the surface thereof, a fluorescent label is attached to a substance to be detected, and the fluorescent-labeled detection target is reacted with the antibody for application to quantitative measurement of the detection target.

According to the sensing method, fluorescent measurement may be performed, but light transmission properties of a resin such as polypropylene are insufficient, and light transmission type measurement is not necessarily possible.

In the present embodiment, the self-assembled monolayer capable of immobilizing a biofunctional molecule is formed on the surface of the molded article produced from a cyclic olefin resin which has very high light transmission properties. The molded article produced from a cyclic olefin resin including a self-assembled monolayer formed on the surface that is obtained by the present embodiment may be applied to light transmission type measurement or fluorescent measurement, and may be expected for a wide variety of biosensing applications.

[Step A]

Similarly to the embodiment described above, step A is a step of irradiating the surface of the cyclic olefin resin molded article with vacuum ultraviolet light. The surface is activated by irradiation with vacuum ultraviolet light.

As a light source, for example, an excimer lamp emitting vacuum ultraviolet light having a center wavelength of 172 nm is used.

[Step B']

In the embodiment, step B' of reacting the surface of the molded article produced from a cyclic olefin resin treated by step A with a silane compound is employed instead of step B of reacting the surface with a fluorine compound.

In other words, step B' is a step of reacting the surface of the molded article activated by step A with a silane compound having an amine end, a tosyl end or a carboxyl end represented by the following Formula (2). In the present embodiment, the oxygen-containing group introduced onto the surface of the molded article by step A is reacted with a silane compound represented by Formula (2), and thereby a molecular film of the silane compound is formed on the surface of the molded article. After step B', the surface of the molded article is made to be capable of immobilizing a labeled antibody, protein, or the like using an amide coupling reaction.

In the present invention, a silane compound represented by the following Formula (2) is used as a surface treatment agent for the molded article produced from a material containing a cyclic olefin resin. Several amino group-containing silane compounds represented by Formula (2) may be used in combination.

(2)

[$R^c$ is a group selected from an amino group, a tosyl group, and a carboxyl group.]

Among the amino group-containing silane compounds represented by Formula (2), preferable ones include $NH_2$—$SiH_3$, $NH_2$—$Si(OCH_3)_3$, $NH_2$—$Si(OCH_2CH_3)_3$, or the like.

[Treatment by Silane Compound]

The method of reacting the surface of the molded article activated by performing step A with the silane compound represented by Formula (2) is not specifically limited so long as the reaction well proceeds. The amino group-containing silane compound represented by Formula (2) is preferably used as an amino group-containing silane compound solution diluted with an organic solvent such as methanol or ethanol. The concentration of the amino group-containing silane compound solution is preferably in a range of 0.01 mM to 10 mM. When the concentration of the amino group-containing silane compound in the amino group-containing silane compound solution is excessively low, an effect of enabling immobilization of an antibody may not be obtained sufficiently or it may take a long period of time to perform the reaction.

Examples of a specific method of reacting the surface of the molded article with an amino group-containing silane compound include a method of immersing the molded article in the amino group-containing silane compound solution, a method of feeding the amino group-containing silane compound solution to the surface of the molded article, and a method of coating the surface of the molded article with the silane compound solution. Among these methods, the method of immersing a molded article in the silane compound solution and the method of feeding the amino group-containing silane compound solution to the surface of the molded article are preferable because the operation is simple and the surface of the molded article may be treated uniformly.

Reaction conditions of the surface of the molded article with an amino group-containing silane compound are not specifically limited so long as the reaction well proceeds. Generally, the reaction of the surface of the molded article with an amino group-containing silane compound is performed under conditions of a temperature of 18° C. to 160° C. and a reaction time of 5 minutes to 12 hours, preferably 40 minutes to 1 hour.

Hereinafter, the surface of the cyclic olefin resin molded article was subjected to the following treatment as steps A and B, and then the surface condition of the cyclic olefin resin molded article after the treatment was investigated.

The sample is a substrate which is a molded article formed using TOPAS 8007S-04 (manufactured by Polyplastics Co., Ltd.) as the cyclic olefin resin and has a square shape of a thickness of 10 mm, a length of 10 mm, and a width of 10 mm.

[1. Treatment of Step A]

As the treatment of step A, a substrate that is the cyclic olefin resin molded article was irradiated with vacuum ultraviolet light having a center wavelength of 172 nm for 30 minutes to 60 minutes using an excimer lamp like described above. Here, the irradiance on the surface of the sample was 10 mW/cm² to 20 mW/cm².

[2. Treatment of Step B']

Next, as step B', the substrate treated as described above was immersed for 1 hour to 24 hours at room temperature in an ethanol solution containing 2 mM to 10 mM in concentration of (3-aminopropyl)trimethoxysilane (3-(trimethoxysilyl)-1-propanamine: $(CH_3O)_3Si(CH_2)_3NH_2$, manufactured by Tokyo Chemical Industry Co., Ltd.) that is an amino group-containing silane compound. After the immersion, the resultant was sufficiently washed with ethanol and dried over nitrogen.

[3. Succinimidation Treatment]

A self-assembled monolayer having an amino end is formed on the surface of the substrate treated by Step B'. In order to immobilize a biofunctional substance to the surface of the substrate thus treated, the amino end was succinimidated according to the following procedure.

In other words, the treated substrate was immersed in a tris(hydroxymethyl)aminomethane buffer solution containing N-(3-dimethylaminopropyl)-N'-ethylcarbodiimide hydrochloride (EDAC, manufactured by Sigma-Aldrich) having a concentration of 50 μg/mL to 500 μg/mL and N-hydroxysuccinimide (NHS, manufactured by Fluka Co., Ltd.) having a concentration of 50 μg/mL to 500 μg/mL to succinimidate the amino end.

The substrate whose amino end of the self-assembled monolayer formed on the surface was succinimidated was washed sufficiently in a Tris buffer solution and a phosphate buffer solution.

[4. Immobilization of Biofunctional Molecule (Antibody)]

A phosphate buffer solution containing mouse monoclonal antibody IgG1 (monoclonal Mouse-IgG1, manufactured by Funakoshi Co., Ltd.) having a concentration of 10 ppm was added dropwise in an amount of 1 mL to the surface of a functional self-assembled monolayer in the substrate subjected to succinimidation of the end, and then an amide coupling reaction of succinimide and the mouse monoclonal antibody IgG1 was maintained for 30 minutes at room temperature.

Substitution of the mouse monoclonal antibody IgG1 (hereinafter, referred to as mouse IgG1) and succinimide occurs by the amide coupling reaction, and the mouse IgG1 is immobilized to the surface of the substrate.

[5. Antibody-Antigen Reaction]

A phosphate buffer solution containing anti-mouse IgG1 goat polyclonal antibody (anti-mouse IgG1, Goat-polyclonal, hereinafter, referred to as anti-mouse IgG1, manufactured by Funakoshi Co., Ltd.) having a concentration of 10 ppm was added dropwise in an amount of 1 mL to the surface of the substrate, and then an antigen-antibody reaction of mouse IgG and anti-mouse IgG1 on the surface was maintained for 30 minutes at room temperature, in order to investigate the reactivity of the substrate on which the mouse IgG1 had been immobilized. Subsequently, the surface of the substrate was washed sufficiently in a phosphate buffer solution.

[6. Measurement of Surface Condition]

Hereinafter, the surface condition of the substrate was investigated at (1) the time point after step B', (2) the time point after the succinimidation step, (3) the time point after the immobilization step of a biofunctional molecule, and (4) the time point after the antibody-antigen reaction, respectively. With respect to investigation of the surface condition, XPS of the surface was performed using an XPS (X-ray electron spectroscopy) device (XPS-7000 type, manufactured by Rigaku Corporation), similarly to the embodiments described above.

In addition, the surface condition at the time point after step A is similar to that of the embodiment described above, and details thereof is omitted. In other words, it was recognized that the olefin ring on the surface of the cyclic olefin resin molded article is cleaved by irradiation of the surface with vacuum ultraviolet light in the atmosphere and oxygen is introduced onto the surface as in the XPS measurement results shown in FIGS. 4 and 5.

Figure 10:
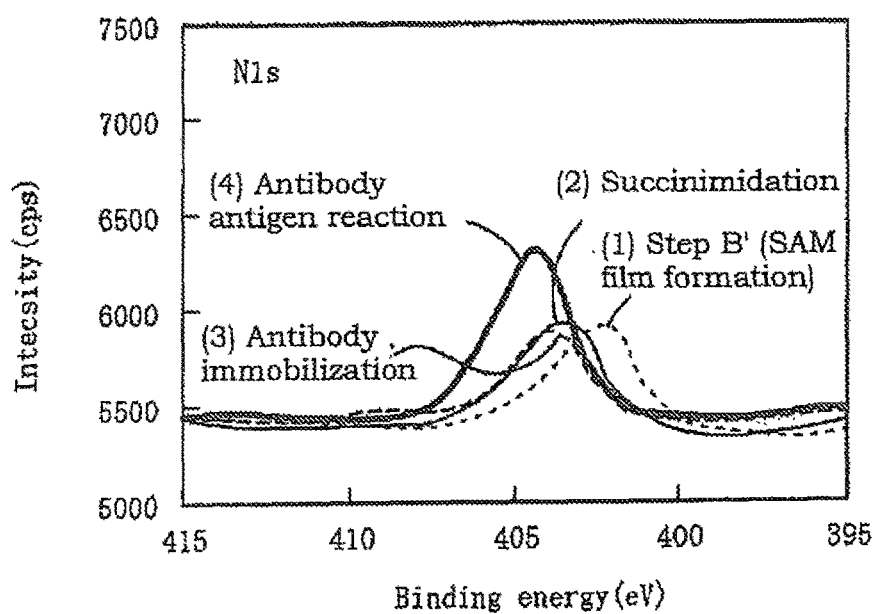
FIG. 10 shows an XPS measurement result for an N1s peak after treatment of reaction with an amino group-containing silane compound.
Figure 11:
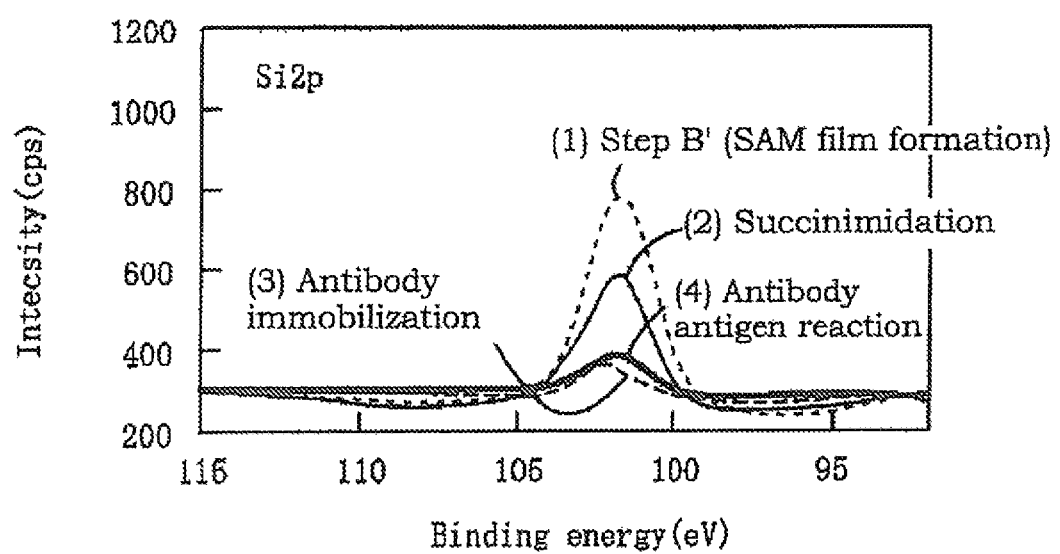
FIG. 11 shows an XPS measurement result for an Si2s peak after treatment of reaction with an amino group-containing silane compound.
Figure 12:
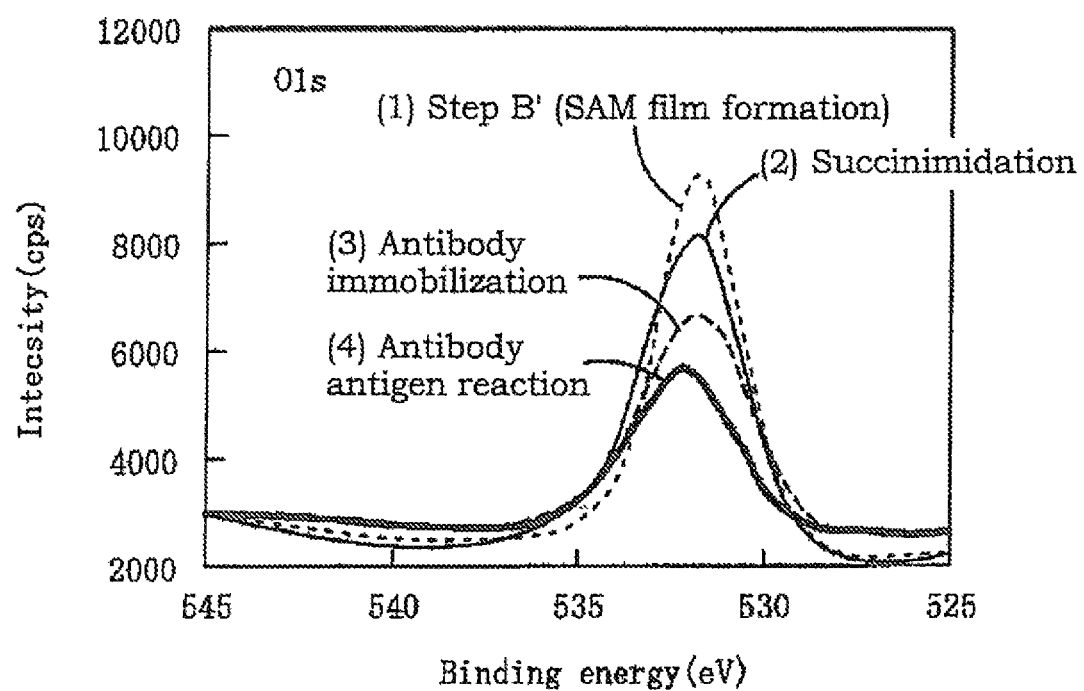
FIG. 12 shows an XPS measurement result for an O1s peak after treatment of reaction with an amino group-containing silane compound.
Figure 13:
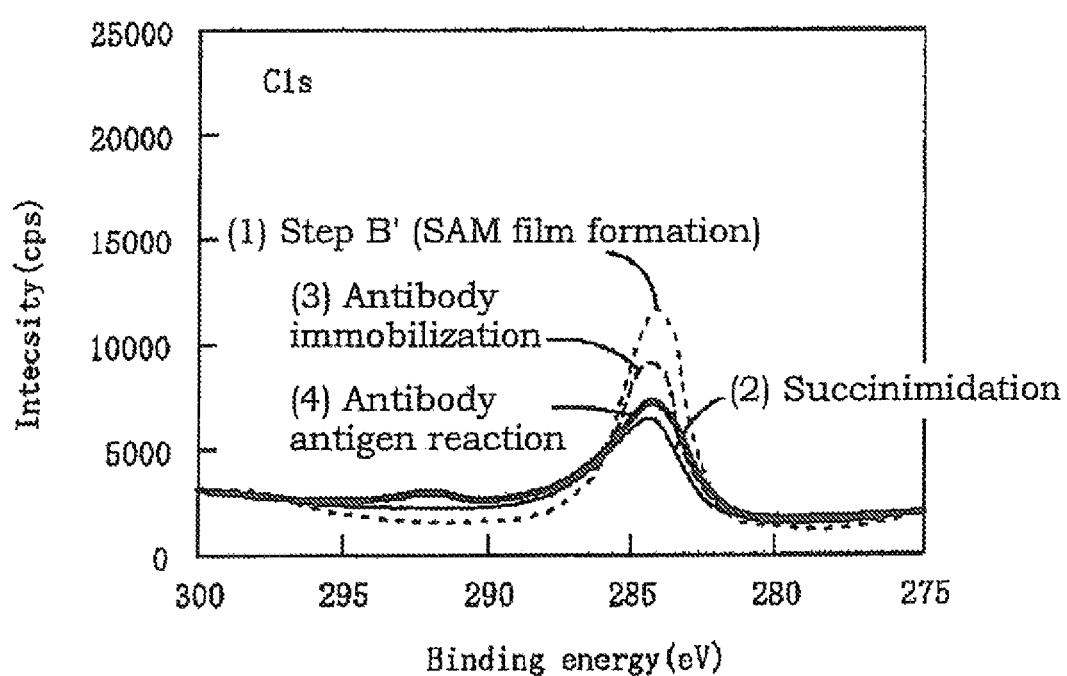
FIG. 13 shows an XPS measurement result for a C1s peak after treatment of reaction with an amino group-containing silane compound.

XPS measurement results are shown in FIGS. 10, 11, 12, and 13. FIG. 10 shows a measurement result for an N1s peak of nitrogen, FIG. 11 shows a measurement result for an Si2p peak of silicon, FIG. 12 shows a measurement result for an O1s peak of oxygen, FIG. 13 shows a measurement result for a C1s peak of carbon, and the longitudinal axis shows the intensity of the binding energy.

(1) Substrate Surface at the Time Point after Step B'

A peak of N1s which was not contained in the cyclic olefin resin was observed as shown in FIG. 10 and a peak of Si2p which was not contained in the cyclic olefin resin was observed as shown in FIG. 11.

From the results, it was demonstrated that the olefin ring was cleaved by step A and the self-assembled monolayer of functional silane having an amino end was formed on the surface of the substrate by the silane coupling reaction of oxygen introduced onto the surface of the substrate with the amino group-containing silane compound represented by Formula (2).

The intensity of an N1s peak shown in FIG. 10 was almost the same as the intensity of an N1s peak of alkanethiol having an amino end. For this reason, it is considered that the content of functional silane having an amino end immobilized to the surface is $10^{-10}$ mol/cm$^2$, which is almost the same as that of an alkanethiol monomolecular layer.

(2) Substrate Surface at the Time Point after Succinimidation Step

As shown in FIG. 11, it is observed that the intensity of an Si2p peak was reduced at the time point after the succinimidation step, compared to the time point after step B'. This suggests that photoelectrons from Si2p were attenuated since the surface of the self-assembled monolayer formed of a silane compound was covered with a succinimide group.

Further, as shown in FIG. 10, it is observed that an N1s peak was shifted to high energy side at the time point after the succinimidation step, compared to the time point after step B'. This is because an amino group modifying an end of the surface of the substrate was changed in structure to a succinimide group.

(3) Substrate Surface at the Time Point after Immobilization Step of Biofunctional Molecule (Antibody)

As shown in FIG. 11, it is observed that the intensity of an Si2p peak was further reduced at the time point after the immobilization step of a biofunctional molecule (antibody), compared to the time point after step B' and the time point after the succinimidation step. This suggests that photoelectrons from Si2p were further attenuated since the surface of the substrate was covered with the thick mouse monoclonal antibody IgG1 (mouse IgG1).

Further, as shown in FIG. 10, it is observed that an N1s peak was further shifted to high energy side at the time point after the immobilization step of a biofunctional molecule (antibody), compared to the time point after step B' and the time point after the succinimidation step. This suggests that the surface of the substrate was covered with a compound having an amide bond.

(4) Substrate Surface at the Time Point after Antibody-Antigen Reaction

As shown in FIG. 10, it is observed that the intensity of an N1s peak was doubled at the time point after the antibody-antigen reaction, compared to the time point after the immobilization step of a biofunctional molecule (antibody). Accordingly, it was found that one anti-mouse IgG1 goat polyclonal antibody (anti-mouse IgG1) was bonded to one mouse IgG1.

Further, as shown FIGS. 12 and 13, when the surface condition of the substrate at the time point after the immobilization step of a biofunctional molecule (antibody) was compared to that of the time point after the antibody-antigen reaction, it is observed that the O1s peak shape corresponding to mouse IgG1 was different from the O1s peak shape corresponding to anti-mouse IgG1, and the C1s peak shape corresponding to mouse IgG1 was different from C1s peak shape corresponding to anti-mouse IgG1. However, since the structure of both the antibodies is very complicated, it is difficult to identify from which position of an antibody the respective peak shapes are derived. In addition, from the result, it is suggested that mouse IgG1 and anti-mouse IgG1 have different contents of carboxyl groups.

According to the present embodiment, the surface of the molded article produced from the cyclic olefin resin can be activated (an olefin ring on the surface of the molded article is cleaved) and oxygen can be introduced onto the activated surface of the molded article by performing the treatment of step A of irradiating the molded article with vacuum ultraviolet light in the atmosphere.

Therefore, there is no need for the oxygen introduction process described in Patent Document 1, and thus simplification of process steps may be achieved.

Further, when the surface of the molded article produced from a cyclic olefin resin is activated by employing step A, the surface of the molded article is not roughened unlike the case of plasma discharge treatment.

Therefore, for example, when microchip substrates are formed as a molded article produced from a material containing a cyclic olefin resin and the microchip substrates are bonded to each other to construct a microchip including a flow channel in which a specimen such as a functional molecule is fed, the surface of the flow channel in the microchip is prevented from roughening, and thus flow of the functional molecule fed in the flow channel is made smooth. Therefore, properties such as the flow rate of the functional molecule may be made uniform, and thus measurement with high accuracy may be performed.

Further, by performing treatment of step A and then treatment of step B', a self-assembled monolayer containing oxygen as a primer may be formed on the surface of the molded article. In other words, a self-assembled monolayer may be formed in which oxygen on the surface of the molded article produced from a cyclic olefin resin subjected to treatment of step A is bonded to a functional group at a first end thereof, and thus functionality may be imparted to the surface of the molded article produced from a cyclic olefin resin based on the function of a functional group at a second end of the self-assembled monolayer.

By employing an amino group as a functional group at the second end of the self-assembled monolayer, introducing the amino group onto the surface of the molded article, and succinimidating the amino end on the surface, a biofunctional molecule such as an antibody may be immobilized to the surface of the molded article.

Further, according to the present embodiment, it is expected that an antibody-antigen reaction may be tested using a test sheet produced from a cyclic olefin resin without use of a microchip.

In addition, in an example of imparting functionality of immobilizing a biofunctional molecule to the surface of the molded article described above, the treatment of step B' is performed to form a self-assembled monolayer having an amino end on the surface of the molded article, and the amino end is succinimidated to immobilize an antibody, but the present invention is not limited thereto. For example, a self-assembled monolayer having a carboxyl end or a tosyl end may be formed on the surface of the molded article.

Further, in the case where functionality of immobilizing an antibody as well as an inorganic substance, for example, a noble metal is imparted to the surface of the molded article, a self-assembled monolayer having a thiol end may be formed on the surface of the molded article. Further, in the case where functionality of immobilizing an organic molecule containing an amine is imparted to the surface of the molded article, a self-assembled monolayer having an aldehyde group end may be formed on the surface of the molded article.

[Example of Production Process of Microchip Obtained by Applying the Present Invention]

Hereinafter, an example of production process of a microchip molded from a cyclic olefin resin obtained by applying the present invention will be described.

Figure 14:
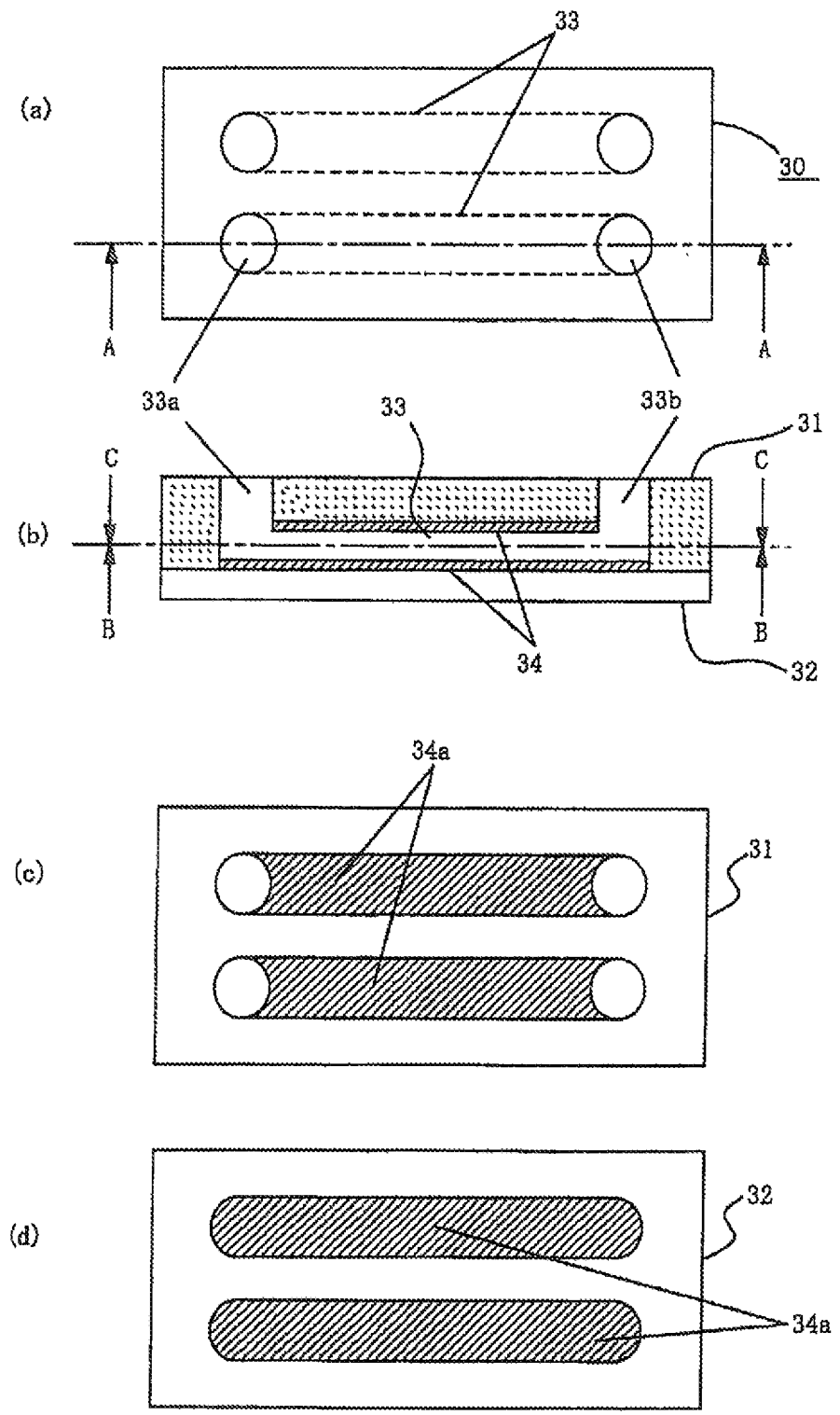
FIG. 14 shows a structural example of a microchip.

FIG. 14 shows a structural example of a microchip. FIG. 14(a) is a top view of a microchip 30 and FIG. 14(b) is a cross-sectional view taken along line A-A of FIG. 14(a).

As shown in FIG. 14(b), the microchip 30 has a structure in which a first microchip substrate 31 and a second microchip substrate 32 are stacked and joined with each other, and both the first microchip substrate 31 and the second microchip substrate 32 are each a molded article produced from a cyclic olefin resin.

For example, the first microchip substrate 31 includes a level difference structure for constituting a flow channel (i.e., microchannel) formed of a fine groove having a width of ten to several hundreds of micrometers and a depth of ten to several hundreds of micrometers. When the first microchip substrate 31 and the second microchip substrate 32 are joined to each other, a flow channel 33 including an inlet 33a and an outlet 33b is formed by the level difference structure and a portion of the surface of the second microchip substrate 32. In addition, in the example shown in FIG. 14(a), two of the flow channels 33 are provided in the microchip 30.

While not being shown, a region (i.e., detection part) having various functions, such as a reaction region in which a reagent is disposed, is provided in two of the flow channels 33. A specimen is fed from the inlet 33a of the flow channel and a reaction of the specimen with the reagent is observed and measured at the detection part. For example, measurement is performed using intermolecular interaction such as immune reaction in clinical examination or the like. The specimen fed to the flow channel from the inlet 33a is discharged from the outlet 33b.

In order to improve the sensitivity of the detection part, at least one portion of the surface of the flow channel 33 is subjected to the surface treatment of the present invention in order that non-specific adsorption that may occur on the surface of the flow channel before a portion of the specimen reaches the detection part may be suppressed as much as possible. For example, the surface treatment is performed by step A of irradiating a treatment region with vacuum ultraviolet light having a center wavelength of 172 nm and step B of reacting the region treated by step A with a fluorine compound solution to form a self-assembled monolayer (SAM film) having a carbon fluoride group as a functional group.

SAM film formation regions in the flow channel are shown in FIGS. 14(c) and 14(d). FIG. 14(c) shows the first microchip substrate 31 viewed from a cross-section taken along line B-B of FIG. 14(b), and FIG. 14(d) shows the second microchip substrate 32 viewed from a cross-section taken along line C-C of FIG. 14(b). The shaded portions in FIGS. 14(c) and 14(d) are SAM film 34 formation regions 34a.

As described above, the microchip 30 is formed by joining the first and second microchip substrates 31 and 32 together, and it is preferable that the SAM film 34 is selectively formed on at least one portion of the surface of the flow channel. This is because since a portion of a region other than the surface of the flow channel serves as a joint surface of both the microchip substrates, a problem may occur at the time of joining both the microchip substrates together when the SAM film 34 is formed also on the joint surface.

Figure 15:
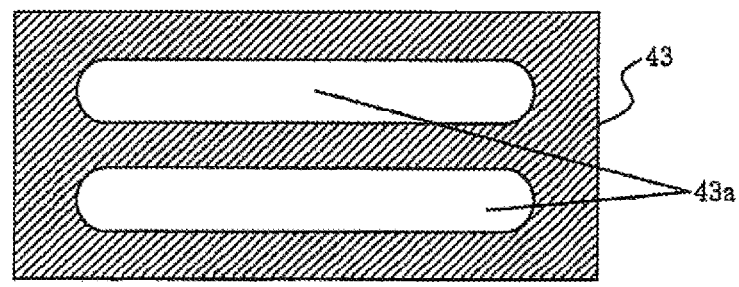
FIG. 15 shows one example of a mask including an opening part with a shape corresponding to a SAM film formation region.

When the SAM films 34 are selectively formed on the first microchip substrate 31 and the second microchip substrate 32, which are the molded articles produced from a cyclic olefin resin, the SAM film formation regions 34a in FIGS. 14(c) and 14(d) may be selectively irradiated with vacuum ultraviolet light in step A. In other words, the first and second microchip substrates 31 and 32 are irradiated with vacuum ultraviolet light through a mask 43 including an opening part 43a with a shape corresponding to the SAM film formation region as shown in FIG. 15.

Hereinafter, an example of production process of the microchip 30 will be described with reference to FIGS. 16 and 17.

FIG. 16(a) is a drawing for illustrating step A in the present invention.

The first microchip substrate 31 and the second microchip substrate 32 are disposed on a work stage 40 for performing step A. The mask 43 shown in FIG. 15 is disposed above that, and lamp houses 41 and 42 including, for example, a plurality of excimer lamps 10 emitting vacuum ultraviolet light are disposed above the mask 43.

The first and second microchip substrates 31 and 32 are disposed on the work stage 40 such that regions R to be irradiated with ultraviolet vacuum light corresponding to the SAM film formation regions are opposed to the excimer lamps 10 in the lamp houses 41 and 42.

The masks 43 are arranged in order that the opening parts 43a with shapes corresponding to the SAM film formation regions may correspond to the regions to be irradiated in the first and second microchip substrates 31 and 32. In addition, since the vacuum ultraviolet light emitted from the excimer lamps 10 is diffusion light, the masks 43 are disposed at positions adjacent to the first microchip substrate 31 and the second microchip substrate 32 as much as possible.

In an example shown in FIG. 16(a), a plurality of lamp houses are provided. In other words, FIG. 16(a) shows a first lamp house 41 for irradiation of the first microchip substrate 31 and a second lamp house 42 for irradiation of the second microchip substrate 32. The number of the excimer lamps 10 in the lamp houses 41 and 42 is appropriately determined according to the shape of the regions to be irradiated in the first and second microchip substrates 31 and 32. In addition, the lamp houses 41 and 42 do not need to be provided for every microchip substrate, and both the first and second microchip substrates 31 and 32 may be irradiated with one large lamp house housing a plurality of excimer lamps.

As the excimer lamp 10, for example, the one having a structure shown in FIG. 1 is used, and a xenon gas is enclosed in the discharge space S of the excimer lamp (see FIG. 1). Vacuum ultraviolet light having a center wavelength of 172 nm is emitted from the excimer lamp.

As for the vacuum ultraviolet light having a center wavelength of 172 nm in the regions to be irradiated of the first and second microchip substrates 31 and 32, for example, the irradiance is 20 mW/cm$^2$ and the irradiation time is 60 minutes.

Next, step B of the present invention will be described with reference to FIG. 16(*b*).

Step B is a step of forming the SAM film 34 on the surface of a cyclic olefin resin after irradiation with vacuum ultraviolet light in step A. Here, as an example, a case in which the surface is reacted with a fluoride compound solution so that a SAM film 34 with a carbon fluoride group as a functional group may be formed on the outermost surface is shown.

Figure 16:
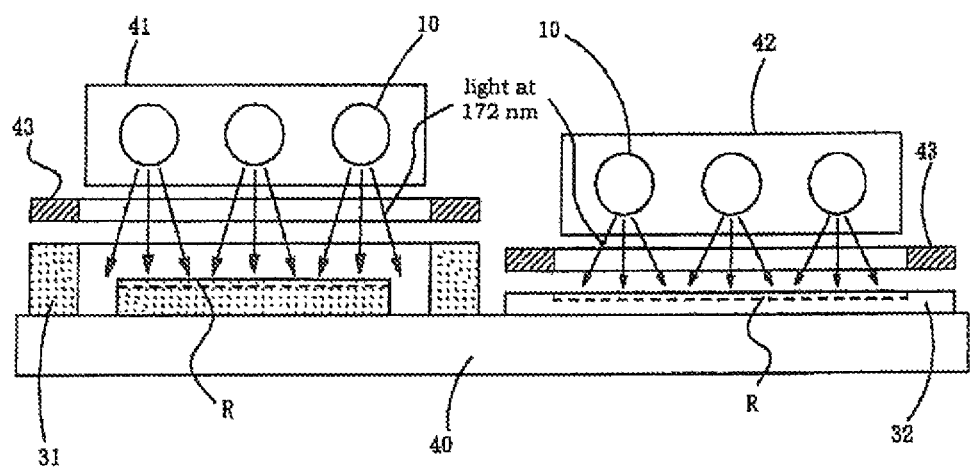
FIG. 16 shows steps (including steps A and B) for producing a microchip.
Figure 16:
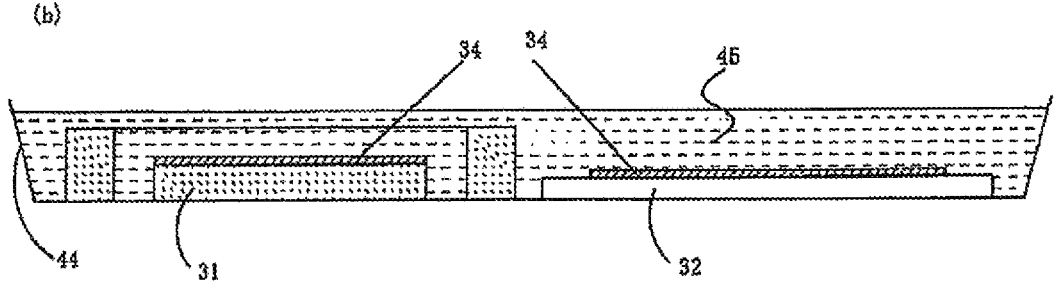

In FIG. 16(*b*), the first and second microchip substrates 31 and 32 which are selectively irradiated with vacuum ultraviolet light having a center wavelength of 172 nm are immersed in a tank 44 filled with a fluorine compound solution 45 (ethanol solution having a concentration of 0.005 M of perfluorobutyl trichlorosilane). Specifically, they are immersed in the tank for 1 hour at room temperature. SAM films 34 having a carbon fluoride group are selectively formed on the outermost surfaces of the regions to be irradiated with the vacuum ultraviolet light in the first and second microchip substrates 31 and 32 through step B.

Figure 17:
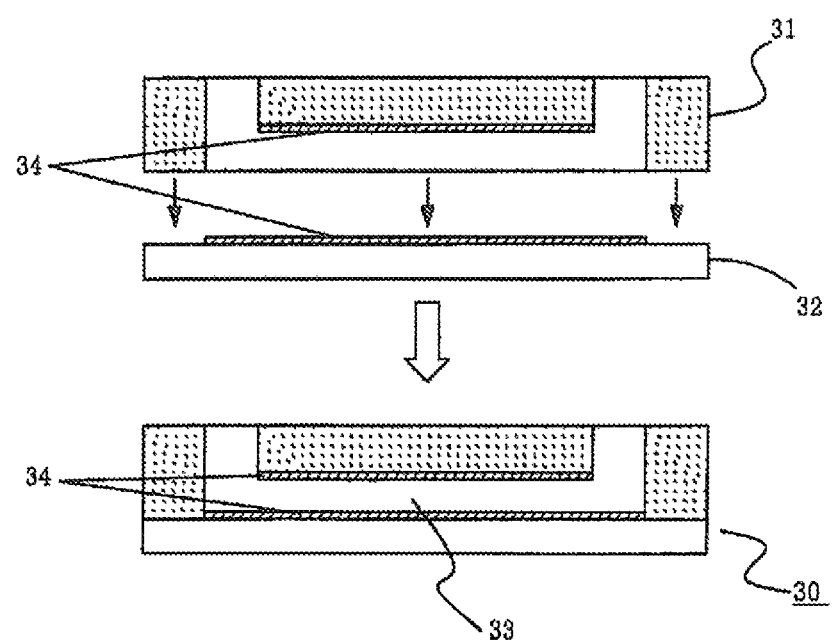
FIG. 17 shows steps (including stacking and joining steps of substrates) for producing a microchip.

Subsequently, as shown in FIG. 17, the first and second microchip substrates 31 and 32 on which the SAM films 34 are selectively formed are stacked and joined together such that the flow channel 33 is formed, to form a microchip 30. Examples of the joining method include publicly known methods such as a method using an adhesive, a method by heat fusion, and a method including irradiating the joint surface of microchip substrates with vacuum ultraviolet light to activate the joint surface, and joining the substrates together.

In addition, in the case where the substrates are joined together using activation by vacuum ultraviolet light, when the SAM film formed by step B is irradiated with vacuum ultraviolet light, the function (in the example shown in FIG. 17, suppression of non-specific adsorption of a biochemical substance or a positive ion substance on the surface of the flow channel) of the SAM film itself may be impaired. Therefore, in order to join the first and second microchip substrates 31 and 32 together, when the joint surface of both the substrates is irradiated with vacuum ultraviolet light, they are preferably shielded such that the SAM film formation region is not irradiated with the vacuum ultraviolet light.

In addition, when plasma discharge treatment is used as in the related art, it is difficult to perform place selective treatment. However, when vacuum ultraviolet light irradiation treatment is used as in step A of the present invention, the mask enables simple and selective treatment. Therefore, the surface of a molded article produced from a cyclic olefin resin may be easily modified locally and selectively (SAM film formation), compared to the related art.

In the aforementioned example, an excimer lamp is used as the light source emitting vacuum ultraviolet light, but the light source is not limited thereto. For example, a rare gas fluorescent lamp may be used.

Figure 18:
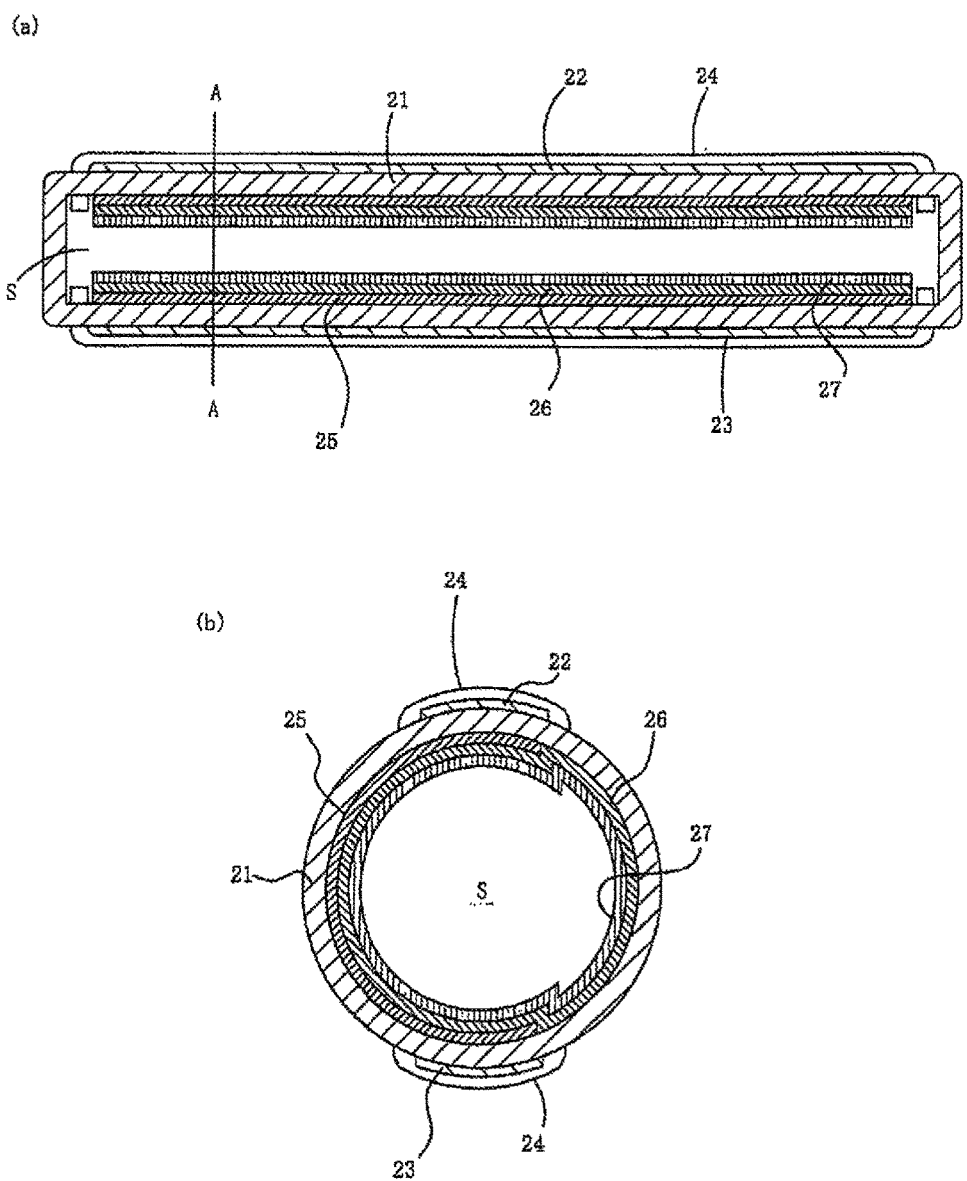
FIG. 18 shows a configuration example of a rare gas fluorescent lamp used for irradiation with vacuum ultraviolet light in the present invention.

FIG. 18 shows a configuration example of a rare gas fluorescent lamp. FIG. 18(*a*) is a cross-sectional view taken at a flat surface including a tube axis, and FIG. 18(*b*) is a cross-sectional view taken along line A-A of FIG. 18(*a*). In FIG. 18, a lamp 20 includes a pair of electrodes 22 and 23, the electrodes 22 and 23 are provided on the outer peripheral surface of a container (light-emitting tube) 21, and a protective film 24 is provided on the outside of the electrodes 22 and 23. An ultraviolet reflective film 25 is provided on the inner surface of the container 21 at the side opposite to the light-emitting direction of the inner peripheral surface thereof (see FIG. 18(*b*)), a low-softening point glass layer 26 is provided on the inner periphery thereof, and a fluorescence substance layer 27 is provided on the inner peripheral surface of the low-softening point glass layer 26.

Other configurations are similar to that shown in FIG. 1, and a gas enclosed in the discharge space S of the container 21 and a fluorescence substance used in the fluorescence substance layer 27 are also similar to those shown in FIG. 1.

When a high frequency voltage is applied to the electrodes 22 and 23, dielectric barrier discharge is formed between the electrodes 22 and 23, and ultraviolet light is generated as described above. Thus, the fluorescence substance is excited and thereby light is generated from the fluorescence substance layer. When the fluorescence substance is selected appropriately, for example, ultraviolet light is generated around a center wavelength of 190 nm from the fluorescence substance layer. The light is reflected at the ultraviolet reflective film 25, and emitted to the outside from an opening part in which the ultraviolet reflective film 25 is not provided.

Further, when a region to be irradiated with vacuum ultraviolet light in the surface of the molded article is small, a deuterium lamp including a wavelength of vacuum ultraviolet light in a wavelength region of emitted light may be used as a light source emitting vacuum ultraviolet light.

EXPLANATION OF REFERENCES

10 Excimer lamp
11 Container (light-emitting tube)
12 Inner electrode
13 Outer electrode
16 Power supply
21 Container (light-emitting tube)
22, 23 Electrode
24 Protective film
25 Ultraviolet reflective film
26 Glass layer
27 Fluorescence substance layer
30 Microchip
31 First microchip substrate
32 Second microchip substrate
33 Flow channel
34 SAM film
40 Work stage
41 First lamp house
42 Second lamp house
43 Mask
44 Tank
45 Fluorine compound solution

The invention claimed is:

1. A surface treatment method for a surface of a molded article produced from a material containing a cyclic olefin resin, comprising:
   irradiating a surface of a molded article produced from a material containing a cyclic olefin resin with vacuum ultraviolet light in the atmosphere including oxygen gas to introduce oxygen to the surface of the molded article, and
   forming a self-assembled monolayer on the irradiated surface.

2. The surface treatment method for a surface of a molded article produced from a material containing a cyclic olefin resin according to claim 1, wherein a portion of the surface is selectively irradiated with the vacuum ultraviolet light, and the self-assembled monolayer is formed on the selectively irradiated surface.

3. The surface treatment method for a surface of a molded article produced from a material containing a cyclic olefin resin according to claim 2, wherein two or more regions separated from one another in the surface are irradiated with the vacuum ultraviolet light, and the self-assembled monolayers are formed on the plurality of irradiated regions.

4. The surface treatment method for a surface of a molded article produced from a material containing a cyclic olefin resin according to claim 1, wherein the molded article is a microchip substrate including a first substrate and a second substrate, and a flow channel is formed in at least one of the first substrate and the second substrate.

5. A surface treatment method for a surface of a molded article produced from a material containing a cyclic olefin resin, wherein the surface treatment of a molded article according to claim 1 is treatment for preventing a biochemical substance from being adsorbed on the surface of the molded article.

6. The surface treatment method for a surface of a molded article produced from a material containing a cyclic olefin resin according to claim 5, wherein the step of forming a self-assembled monolayer is a step of reacting the surface of the molded article with a fluorine compound represented by the following Formula (1):

$(R^a)Si(R^b)_3$     (1)

[$R^a$ is a group selected from a fluorine-containing hydrocarbon group or a perfluoroalkyl group having 3 to 10 carbon atoms; and $R^b$ is a group selected from chlorine, bromine, iodine, a methoxy group, an ethoxy group, an n-propyloxy group, and an isopropyloxy group].

7. A surface treatment method for a surface of a molded article produced from a material containing a cyclic olefin resin, wherein the surface treatment of a molded article according to claim 1 is treatment for imparting functionality of immobilizing a biofunctional molecule to the surface of the molded article.

8. The surface treatment method for a surface of a molded article produced from a material containing a cyclic olefin resin according to claim 7, wherein the step of forming a self-assembled monolayer is a step of reacting the surface of the molded article with an amino group-containing silane compound represented by the following Formula (2):

$(NH_2)Si(R^c)_3$     (2)

[$R^c$ is a group selected from an amino group, a tosyl group, and a carboxyl group].

* * * * *